United States Patent
Pez et al.

(10) Patent No.: US 8,003,073 B2
(45) Date of Patent: Aug. 23, 2011

(54) AUTOTHERMAL HYDROGEN STORAGE AND DELIVERY SYSTEMS

(75) Inventors: Guido Peter Pez, Allentown, PA (US); Alan Charles Cooper, Macungie, PA (US); Aaron Raymond Scott, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 12/103,205

(22) Filed: Apr. 15, 2008

(65) Prior Publication Data
US 2008/0260630 A1 Oct. 23, 2008

Related U.S. Application Data

(60) Provisional application No. 60/911,988, filed on Apr. 16, 2007.

(51) Int. Cl.
 C01B 3/26 (2006.01)
 C01B 6/24 (2006.01)
(52) U.S. Cl. .................. 423/651; 423/644
(58) Field of Classification Search .......... 208/141, 208/143, 144, 145; 423/651; 585/379; 502/1; C10G 45/04; C01B 3/26
See application file for complete search history.

(56) References Cited

U.S. PATENT DOCUMENTS

| | | | |
|---|---|---|---|
| 3,483,210 A | 12/1969 | Rosenblatt et al. | |
| 3,843,216 A | 10/1974 | Campbell | |
| 4,042,621 A | 8/1977 | Sauer | |
| 4,359,404 A | 11/1982 | Grey et al. | |
| 4,560,816 A * | 12/1985 | Davis, Jr. .......... | 585/266 |
| 4,567,033 A | 1/1986 | Kesten | |
| 5,958,821 A * | 9/1999 | Ishii et al. ........ | 502/167 |
| 6,455,830 B1 | 9/2002 | Whalen et al. | |
| 7,101,530 B2 | 9/2006 | Pez et al. | |
| 7,108,933 B2 | 9/2006 | Gelsey | |
| 7,294,420 B2 * | 11/2007 | Hodges .............. | 429/17 |
| 7,351,395 B1 | 4/2008 | Pez et al. | |
| 2003/0008187 A1* | 1/2003 | Higashiyama et al. ...... | 429/19 |
| 2003/0046867 A1* | 3/2003 | Woods et al. .......... | 48/127.9 |
| 2003/0092877 A1 | 5/2003 | Amendola et al. | |

(Continued)

FOREIGN PATENT DOCUMENTS
EP 0779264 6/1997
(Continued)

OTHER PUBLICATIONS
John H. Sinfelt "The turnover frequency of methylcyclohexane dehydrogenation to toluene on a Pt reforming catalyst" Journal of molecular catalysis. Feb. 11, 2000.*

(Continued)

*Primary Examiner* — Jessica L Ward
*Assistant Examiner* — Alexander Polyansky
(74) *Attorney, Agent, or Firm* — Michael K. Boyer

(57) ABSTRACT

Processes are provided for the storage and release of hydrogen by means of dehydrogenation of hydrogen carrier compositions where at least part of the heat of dehydrogenation is provided by a hydrogen-reversible selective oxidation of the carrier. Autothermal generation of hydrogen is achieved wherein sufficient heat is provided to sustain the at least partial endothermic dehydrogenation of the carrier at reaction temperature. The at least partially dehydrogenated and at least partially selectively oxidized liquid carrier is regenerated in a catalytic hydrogenation process where apart from an incidental employment of process heat, gaseous hydrogen is the primary source of reversibly contained hydrogen and the necessary reaction energy.

24 Claims, 9 Drawing Sheets

U.S. PATENT DOCUMENTS

2004/0199039 A1    10/2004  Brophy et al.
2005/0002857 A1*    1/2005  Pez et al. .................. 423/648.1
2005/0002877 A1     1/2005  Miller

FOREIGN PATENT DOCUMENTS

EP    1 236 679 A2    9/2002
WO    0153252         7/2001

OTHER PUBLICATIONS

Zhang et al. "Gas Phase Selective Catalytic Oxidation of Toluene to Benzaldehyde on V2O5-Ag2O/η-Al2O3 Catalyst" Journal of Natural Gas Chemistry [Manuscript received May 21, 2004; revised Sep. 29, 2004].*

Mamaladze et al. "Mechanism of catalytic hydrogenation of Toluene on Nickel Catalyst" Akademia Nauk, Gruzia, SSR 1974.*

Fabri et al. Ullman's Encyclopedia of Industrial Chemistry. "Toluene." 2005.*

FindTarget. "Alcohol Oxidation". 1999-2010.*

UCalgary. "Oxidation of Alcohols". http://www.chem.ucalgary.ca/courses/351/Carey/Ch15/ch15-4-6.html. No Date.*

Sandrock, Gary; "A panoramic overview of hydrogen storage alloys from a gas reaction point of view;" Journal of Alloys and Compounds, (1999) p. 877-888.

Dillon, A.C. et al; "Hydrogen storage using carbon adsorbents: past, present and future;" Applied Physics A Material Science & Processing; (2001) p. 133-142.

Wong-Foy, et al; "Exceptional H2 Saturation Uptake in Microporous Metal—Organic Frameworks;" J. Am. Chem. Soc. 126; (2006) p. 3494-3495.

Grunenfelder, et al; "Seasonal Storage of Hydrogen in Liquid Organic Hydrides: Description of the Second Prototype Vehicle:" J. Hydrogen Energy; vol. 14, No. 8 (1989) p. 579-586.

Kariya; et al; "Efficient evolution of hydrogen from Liquid cycloalkanes over Pt-containing catalysts supported on active carbons under wet-dry multiphase conditions;" Applied Catalysis A; 233; (2002) p. 91-102.

Han, Yuwang et al "Macrokinetic analysis of isopropanol dehydrogenation over Cu/SiO2 catalytic;" Applied Catalysis; 205; (2001) p. 79-84.

Raja et al; "Benign oxidants and single-site solid catalysts for the solvent-free selective oxidation of toluene;" Catalysts Letters; vol. 110, Nos. 3-4; Sep. 2006 p. 179-183.

Guo et al; "Selective liquid phase oxidation of toluene with air;" Applied Catalysis; 282 (2005); p. 55-59.

Clark et al; Catalytic Oxidation of Diphenylmethanes using Alumina-supported Fluorides; J. Chem Research; 5 (1994) p. 102-103.

Choudhary et al; "MnO4-1 exchanged Mg-Al hydrotalcite: a stable and reusable/environmental-friendly catalyst for selective oxidation by oxygen of ethylbenzene to acetophenone and diphenylmethane to benzophenone;" Journal of Catalysis; 227; (2004) p. 257-261.

Nekhaev, et al; "Oxidative dehydrogenation of Saturated Hydrocarbons in the Presence of Polyoxotungstates;" Neftekhimiya; 42 (2002; p. 455-459 (Translation included).

Mallat et al; "Oxidation of Alcohols with Molecular Oxygen on Solid Catalysts;" Chem Rev. 104; (2004) p. 3037-3058.

Christensen et al; "Formation of Acetic Acid by Aqueous-Phase Oxidation of Ethanol with Air in the Presence of a Heterogeneous Gold Catalyst;" Angew. Chem. Int. Ed. 45, (2006) p. 4658-4651.

Abad et al; "A Collaborative Effect between Gold and a Support Induces the Selective Oxidation of Alcohols;" Angew. Chem. Int. Ed. 44; (2005); p. 4066-4069.

Maeda et al; "Copper-Catalyzed Oxidation of Amines with Molecular Oxygen;" Bull. Chem. Soc. Jpn. 75 (2003); p. 2399-2403.

Yamaguchi et al; "Efficient Heterogeneous Aerobic Oxidation of Amines by a Supported Ruthenium Catalyst;" Angew Chem. Int. Ed. 42 (2003); p. 1479-1483.

Laine et al; "Homogeneous Catalytic formation of carbon-nitrogen bonds;" C1 Molecule Chemistry' 1/1; (1984) p. 1-8.

Mashkina, A. V.; "Catalytic Synthesis of Sulfoxides and Sulfones Via Oxidation of Sulfides by Molecular Oxygen," Catal. Rev.-Sci. Eng.; 32(1&2) (1990); 105-161.

Komatsu et al; "Air Oxidation of Sulfides to Sulfoxides Using BiBr3-Bi(NO3)3 as a Binary Catalyst;" Chemistry Letters; 12; (1997); p. 1229-1230.

Karimi, Babak et al; "Rapid Efficient and Chemoselective Deoxygenation of Sulfoxides to Thioethers Using NaBH4/I2;" Synthesis; 3; (2003); p. 335-336.

Bateman et al; "Catalytic Hydrogenation of Unsaturated Sulphides and Sulphones;" J. Chem. Soc. (1958) p. 2888-2890.

Majunke et al; "Catalytic Oxidation of Fluorene to 9-Fluorenone—Development and Characterization of Catalysts;"Proceedings of the 10th Int. Congress on Catalysis; Jul. 19-24, 1992; p. 707-717.

Meusinger et al; "Assignment of all Diastereomers of Perhydrofluorene in a Mixture Using 13XC NMR Spectroscopy;" J. Prakt. Chem; (339; (1997); p. 128-134.

Rylander, Paul; "Miscellaneous Hydrogenolyses;" (Chapter 15)—Catalytic Hydrogenation in Organic Syntheses; Academic Press (1979) p. 271-275.

Rylander, Paul; Hydrogenatioan of Carbocyclic Aromatics; (Chapter 11)—Catalytic Hydrogenation in Organic Syntheses; Academic Press (1979); p. 175-179.

Rylander, Paul; "Hydrogenaton of Acids, Esters, Lactones, and Anhydrides;" (Chapter 4)—Catalytic Hydrogenation in Organic Syntheses; Academic Press (1979); p. 64-65.

Rylander, Paul; "Hydrogenation of Ketones;" (Chapter 6)—Catalytic Hydrogenation in Organic Syntheses; Academic Press (1979); p. 82-85.

Nishimura, Shigeo; "5.3 Ketones;" Handbook of Heterogeneous Catalytic Hydrogenation for Organic Synthesis: John Wiley & Sons, Inc.; (2001); p. 185-193.

Nishimura, Shigeo; "Hydrogenation of Aldehydes and Ketones;" (Chapter 5) Handbook of Heterogeneous Catalytic Hydrogenaton for Organic Synthesis; John Wiley & Sons, Inc.; (2001); p. 170-178.

Nishimura, Shigeo; "Hydrogenation of Carboxylic Acids, Esters, and Related Compounds;" (Chapter 10) Handbook of Heterogeneous Catalytic Hydrogenation for Organic Synthesis; John Wiley & Sons, Inc.; (2001); p. 387-391.

Nishimura, Shigeo; "Acids Amides, Lactams, and Imides;" (Chapter 10.3) Handbook of Heterogeneous Catalytic Hydrogenation for Organic Synthesis; John Wiley & Sons, Inc.; (2001); p. 406-411.

Resini, et al; "Production of Hydrogen by Steam Reforming of C3 Organics Over Pd-Cu/Gamma-A1203 Catalyst"; International Journal of Hydrogen Energy, Elsevier Science Publishers B.V., Barking, GB; vol. 31 No. 1; Jan. 1, 2006; pp. 13-19; XP005211328.

Grunenfelder, N.F., et al; "Seasonal Storage of Hydrogen in Liquid Organic Hydrides: Description of the Second Prototype Vehicle"; International Journal of Hydrogen Energy, Elsevier Science Publishers B.V., Barking, GB; vol. 14, No. 8; Jan. 1, 1989; pp. 579-586; XP023640338.

Kariya, N., et al; "Efficient Evolution of Hydrogen from Liquid Cycloalkanes over Pt-Containing Catalysts Supported on Active Carbons Under "Wet-Dry Multiphase Conditions""; Applied Catalysts A: General, Elsevier Science, Amsterdam, NL; vol. 233; No. 1-2; Jul. 10, 2002; pp. 91-102; XP004367106.

Meng, N., et al; "Improvements on Thermal Efficiency of Chemical Heat Pump Involving the Reaction Couple of 2-Propanol Dehydrogenation and Acetone Hydrogenation"; International Journal of Hydrogen Energy, Elsevier Science Publishers B.V., Barking, GB; vol. 22, No. 4; Apr. 1, 1997; pp. 361-367; XP004053279.

Hodoshima, S., et al; "Catalytic Decalin Dehydrogenation/Napthhalene Hydrogenation Pair as a Hydrogen Source for Fuel-Cell Vehicle"; International Journal of Hydrogen Energy, Elsevier Science Publishers, B.V., Barking, GB; vol. 28, No. 11; Nov. 1, 2003; pp. 1255-1262; XP004433960.

Becker and Hirscher; "Hydrogen Storage in Carbon Nanotubes," J. Nanosci Nanotech, 2003, vol. 3, No. 1/2 pp. 3-17.

* cited by examiner

AUTOTHERMAL HYDROGEN STORAGE AND DELIVERY SYSTEMS

CROSS-REFERENCE TO RELATED APPLICATIONS

This Application claims the benefit of Provisional Application No. 60/911,988, filed on Apr. 16, 2007. The disclosure of the Provisional Application is hereby incorporated by reference.

STATEMENT REGARDING FEDERALLY SPONSORED RESEARCH OR DEVELOPMENT

This invention was made with government support under Contract Number DE-FC36-04GO14006 between Air Products and Chemicals, Inc. and the U.S. Department of Energy. The Government has certain rights to this invention.

BACKGROUND OF THE INVENTION

The invention relates to the field of hydrogen storage systems and in particular to a process of releasing the stored hydrogen from hydrogen carrier compositions ("carrier") for use in a fuel cell or internal combustion engine. Disclosed are methods and apparatus for conducting a thermally self-sustaining or autothermal catalytic dehydrogenation of a carrier to supply hydrogen wherein the necessary heat for this reaction is derived, at least in part, from an accompanying exothermic dehydrogenation of the carrier.

Hydrogen can be stored as a compressed gas, as liquid hydrogen at cryogenic temperatures and as the captured or contained gas in various carrier media, examples of which are metal hydrides [for examples see: G. Sandrock, *J. of Alloys and Compounds*, 293-295, 877 (1999)], high surface area carbon materials [for examples see: A. C. Dillon and M. J. Heben, *Appl. Phys. A* 72, 133 (2001)], and metal-organic framework materials [A. G. Fong-Way, et al., *J. Am. Chem. Soc.* 128, 3494 (2006)]. In metal hydrides the hydrogen is dissociatively absorbed while for the latter two material classes, which have only demonstrated significant capacities at low temperatures, the hydrogen molecule remains intact on adsorption. Generally, the contained hydrogen in such carrier media can be released by raising the temperature and/or lowering the hydrogen pressure. The release of hydrogen is an endothermic process, i.e., one which requires an input of heat, at a temperature where the dehydrogenation of the carrier can proceed with adequate reaction rates.

Hydrogen can also be stored by means of a catalytic reversible hydrogenation of unsaturated, usually aromatic, organic compounds such as benzene, toluene or naphthalene. The utilization of organic hydrogen carriers, sometimes referred to as "organic hydrides", for hydrogen storage and delivery has been described in the context of a hydrogen powered vehicle [N. F. Grünenfelder et al. *Int. J. of Hydrogen Energy* 14, 579 (1989)]. Other examples of the dehydrogenation of organic hydrogen carriers are the dehydrogenation of decalin under "wet-dry multiphase conditions" [N. Kariga et al. *Applied Catalysis A*, 233, 91 (2002)], and dehydrogenation of methylcyclohexane to toluene (A. S. Kesten, U.S. Pat. No. 4,567,033; hereby incorporated by reference). The dehydrogenation of a cyclic alkane (e.g., decalin) to the corresponding aromatic compound (naphthalene) is an endothermic reaction requiring an input of heat which is the dehydrogenation reaction enthalpy, ΔH. For the test vehicle described by N. F. Grünenfelder et al., some of the required ΔH comes from the engine's exhaust system and the remainder is supplied by a combustion of hydrogen. In U.S. Pat. No. 4,567,033, Kesten likewise points to the need of supplying heat for the catalytic dehydrogenation of methylcyclohexane to toluene which is accomplished by a combustion of a considerable portion of the product hydrogen.

U.S. Pat. Nos. 7,101,530 and 7,351,395 (hereby incorporated by reference) describe methods for hydrogen storage using carriers via a reversible hydrogenation of pi-conjugated substrates. The disclosed substrates comprise cyclic organic molecules containing nitrogen or oxygen heteroatoms, which have a lower enthalpy or heat of dehydrogenation than benzene, toluene and naphthalene. The "spent" or at least partially dehydrogenated aromatic or pi-conjugated substrates can be regenerated in a spontaneous, exothermic catalytic reaction with hydrogen.

J. Gelsey in U.S. Pat. No. 7,108,933 (hereby incorporated by reference) describes a means for a thermally efficient hydrogen storage, specifically an apparatus wherein endothermic and exothermic $H_2$-generation reactions can be carried out in close thermal contact, with in one aspect, heat being supplied to the endothermic hydrogen generator. Some cited examples of exothermic, heat-releasing $H_2$ generation reactions are platinum catalyzed sodium borohydride/water to sodium borate, lithium hydride/water to lithium hydroxide, and lithium aluminum tetrahydride/ammonia systems. All are spontaneously $H_2$-releasing reactions which cannot, for thermodynamic reasons, be directly reversed with hydrogen, their active components being only regenerable in often energy-intensive multi-step chemical processes. This is exemplified by a proposed scheme for the regeneration of sodium borohydride from sodium borate as described by S. Amendola et al. in U.S. Pub. No. 2003/0092877. In contrast to the above cited aromatics and pi-conjugated substrates, these exothermic $H_2$-generators are thus not hydrogen carriers in the sense of being directly regenerable in a catalytic process with hydrogen.

The foregoing patents and patent applications are hereby incorporated by reference.

There is a need in this art for a hydrogen storage medium or carrier that can be used to generate hydrogen from a storage medium, with no or relatively small external input of heat.

BRIEF SUMMARY OF THE INVENTION

The instant invention satisfies the foregoing need in this art by providing methods and apparatus for the dehydrogenation of a carrier where at least part of the heat of dehydrogenation is provided by a hydrogen-reversible selective oxidation of the same carrier using air or oxygen. In some cases, autothermal generation of hydrogen is achieved wherein sufficient heat is provided to sustain the endothermic dehydrogenation of the carrier at reaction temperature. The amount of heat may be in excess of the amount necessary to cause dehydrogenation and, if desired, the excess heat can be captured and/or employed to drive another system. The at least partially dehydrogenated and at least partially selectively oxidized carrier ("spent carrier") is regenerated by an addition of hydrogen in a catalytic hydrogenation process where apart from an incidental employment of process heat, hydrogen is the primary or sole fuel or energy source.

In one aspect of the invention, hydrogen carrier systems are provided wherein hydrogen can be liberated substantially or completely without an external input of heat. The hydrogen carriers typically comprise at least two components: (a) an aromatic hydrocarbon or a pi-conjugated aromatic molecule which can store hydrogen by reversible catalytic chemical hydrogenation/dehydrogenation processes and (b) a component that can undergo a hydrogen-reversible catalytic oxidation reaction. In a catalytic reactor system, the heat input required for releasing hydrogen from the carrier is provided, at least in part, by an exothermic selective oxidation of the latter second component of the carrier with, for instance, air or oxygen. This second component may be any suitable material or combinations thereof such as: i) molecules comprising an activated hydrocarbon group, or a primary alcohol function—substrates that can be selectively oxidized to an aldehyde, ketone or carboxylic acid; ii) a secondary alcohol reacting to produce a ketone; primary, secondary and tertiary amines which can be respectively oxidatively converted to nitrites or N-heterocyclics, and formamides; and iii) sulfides which can be selectively oxidized to sulfoxides and sulfones. These selectively oxidizable reaction materials at the respective functional groups may be employed simply in a physical mixture with the reversibly hydrogen reactive compositions or in chemical combination with the latter.

In another aspect of the invention, the reversibly hydrogen reactive carrier and the second component's oxidizable functional group are present in the same molecule. The relative amounts can be adjusted so as to provide an autothermal, and in some cases, a slightly greater than exothermic generation of hydrogen. The at least partially dehydrogenated and at least partially selectively oxidized carrier can be regenerated by catalytic hydrogenation processes, thus substantially providing the original hydrogen-loaded carrier.

Another aspect of the invention relates to a composition comprising:

a first component capable of reversible catalytic hydrogenation and dehydrogenation, and a second component having an at least partially selectively oxidizable functional group.

A further aspect of the invention relates to a process for releasing hydrogen and generating heat comprising:

providing a composition comprising a reversibly hydrogen reactive carrier having oxidizable functional groups, contacting the composition under selective oxidation conditions with at least one catalyst to generate heat, contacting the composition with at least one catalyst under conditions sufficient to release hydrogen from the composition, and;

recovering the heat to provide at least part of the heat required to release the hydrogen, and;

converting the at least partially dehydrogenated and selectively oxidized carrier back to the original hydrogen-loaded carrier via one or more catalytic hydrogenation processes.

DETAILED DESCRIPTION OF THE INVENTION

The instant invention relates to hydrogen storage compositions and to methods for using the compositions to generate hydrogen from a carrier with no external input of heat or substantially no external input of heat. The carrier comprises a medium which can undergo two catalytic reactions to provide hydrogen and heat energy and an at least partially dehydrogenated and at least partially oxidized product which can be catalytically re-hydrogenated, thus regenerating the carrier. In one of the catalytic reactions, the carrier undergoes a spontaneous catalytic dehydrogenation with a release of gaseous hydrogen. This is an endothermic process for which at least a portion of the required heat is furnished in the second reaction by a subsequent exothermic air- or oxygen-induced selective oxidation of the carrier. Alternatively, the process sequence could be reversed with a the selective, partial oxidation of the carrier being conducted prior to dehydrogenation stepcarried out first. When all or substantially all of the required dehydrogenation reaction heat is provided in his way, a desirable autothermal or thermally totally self-sustaining generation of hydrogen is realized. The resulting at least partially dehydrogenated, at least partially oxidized carrier is converted back to the original hydrogen-loaded carrier in one or more selective catalytic hydrogenation processes.

Hydrogen Generation Apparatus and Process

Figure 1:
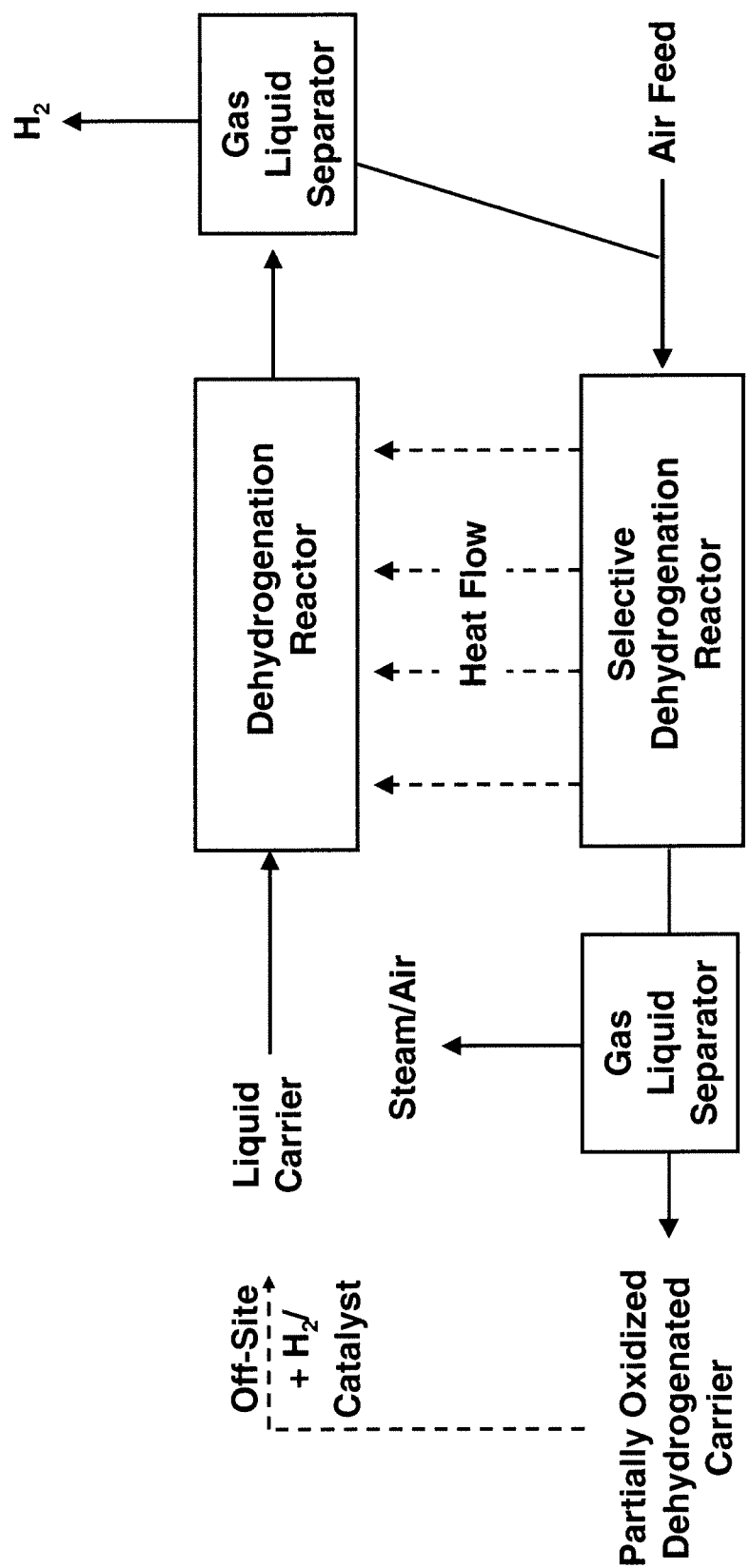
FIG. 1 is a schematic of a sequential process of carrier dehydrogenation, selective oxidation, and regeneration with gaseous hydrogen.

One aspect of the invention relates to an apparatus and process for conducting an autothermal generation of hydrogen, with a regeneration using gaseous hydrogen an (usually conducted off-site) regeneration of hydrogen is shown schematically in FIG. 1. The hydrogenated carrier is passed through a catalytic reactor which may comprise any suitable reactor such as: i) a tubular device packed with catalyst pellets, ii) a monolith reactor consisting of a parallel array of internally catalyst-coated tubular structures, iii) one of two or more sets of tubular elements or flow conduits of a microchannel reactor, among other reactor types capable of conducting a conversion involving three phases (e.g., solid [catalyst], liquid [feed and dehydrogenated product] and gas [hydrogen], [steam]). While any suitable reactor can be employed, examples of suitable microchannel reactors are shown in U.S. Pub. No. 2004/0199039 and U.S. Pat. No. 6,455,830; both hereby incorporated by reference. The stream from the reactor containing hydrogen and partially dehydrogenated carrier is passed through a gas-liquid separator. Ideally, by employing a carrier that has low vapor pressure at all levels of hydrogenation, a relatively pure hydrogen product stream may be easily obtained. For more volatile carriers, a variety of separation methodologies including the use of hydrogen-selective membranes may be employed for effecting the separation and recovery of this product hydrogen from the process stream. The remaining carrier stream is now admixed with a controlled flow of air and is passed through a second catalytic reactor where a selective oxidation reaction takes place (e.g., in the liquid phase) with evolution of heat at the temperature of reaction. In another aspect, the remaining liquid stream may be vaporized and the selective catalytic reaction now carried out (e.g., in the gas phase). The selective oxidation products are steam and the now more fully dehydrogenated carrier. While not necessary for successful operation of this aspect, ideally, the two reactors are highly thermally integrated, to most efficiently provide the heat for the endothermic hydrogen generation reaction. This heat integration may be accomplished by means of a circulating heat-transfer fluid, among other suitable means and methods. If desired, the two reactors' tubular elements may be the closely adjacent channels of a microchannel reactor thus providing a compact reactor device having good internal heat transfer characteristics. The selective oxidation product, which can be viewed as the "spent" carrier", is regenerated (usually at another location from the point of $H_2$ delivery) in a catalytic reaction with hydrogen.

In another aspect of the invention (illustrated in FIG. 2), the heat-generating selective oxidation of the carrier is carried out first, with heat energy, steam and a selectively oxidized carrier as its generated products. Following the removal of any residual air and steam, the selectively oxidized carrier is then catalytically dehydrogenated in the second reactor with production of hydrogen. In this aspect, the "second component" as referred to above, of the carrier undergoes the heat-generating selective oxidation with, ideally, the perhydrogenated aromatic hydrocarbon or perhydrogenated aromatic portion of the hydrogen carrier molecule(s) not being significantly affected. However, some limited oxidative dehydrogenation of the perhydrogenated aromatic hydrocarbon or per-hydrogenated aromatic portion of the hydrogen carrier molecule(s), which latter compositions with are inherently exothermic processes, may be beneficial when an additional source of heat is required to supply the endothermic dehydrogenation step of the process (see below).

Figure 2:
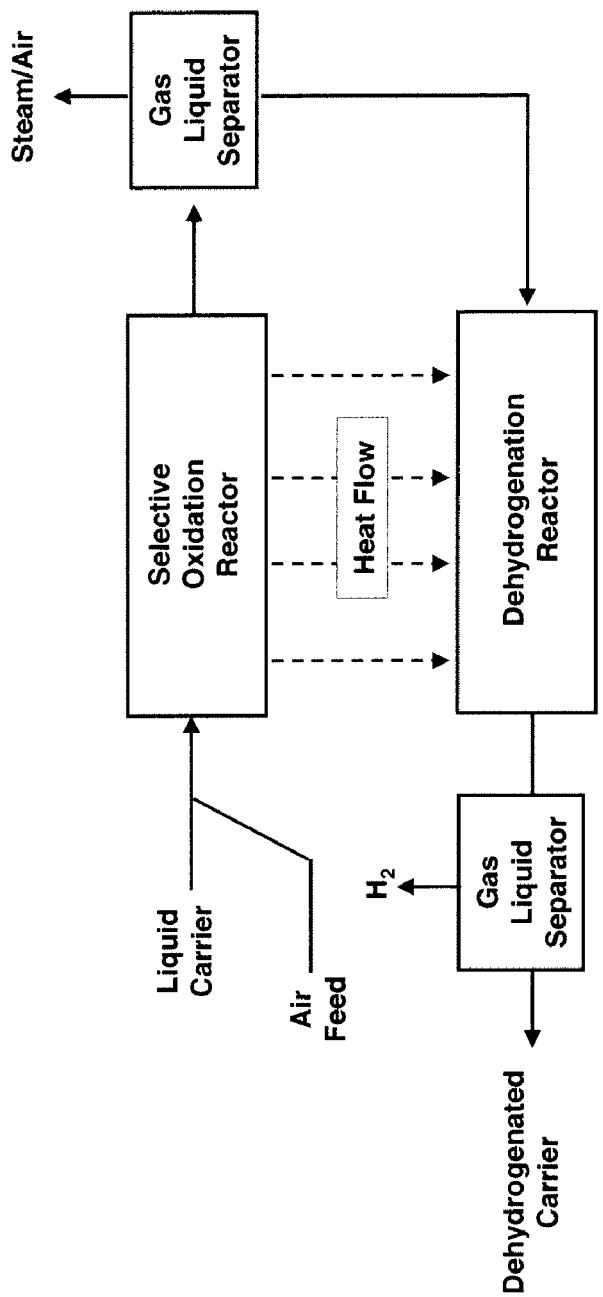
FIG. 2 is a schematic of a carrier sequential oxidation-dehydrogenation process.

In each of these aspects for delivering hydrogen from a carrier in an overall autothermal or thermally self-sustaining process there is also the option of providing a continuous source of excess heat vis-a-vis that required for dehydrogenation, for instance as may be needed for heating or cooling the passenger compartment of a vehicle. Generally, this could be accomplished by designing the carrier wherein the selective oxidation of the second component is now more exothermic. When however, a fast, but transient increase in the rate of production of hydrogen from the carrier is required, as for instance in the rapid acceleration of a vehicle or in the start-up of the device from ambient conditions, the following processes may be employed. Referring to the aspect as illustrated in FIG. 2, the liquid carrier instead of entering the dehydrogenation reactor is led directly into a preheated oxidation reactor (which may be preheated via electrical resistive heating or other suitable means) where it undergoes an at least partial oxidative dehydrogenation of its reversibly bound hydrogen, and perhaps additionally, as a selective oxidation of a functional group on the carrier's second component. Since both reactions are exothermic, an enhanced quantity of heat per unit mass of carrier is generated (as discussed in Example 2) at potentially higher temperatures. This facilitates heat transfer to the dehydrogenation reactor which can thus more quickly come to a higher reaction temperature and deliver hydrogen at an enhanced flow rate. For a cold start-up situation, the carrier can be directed (as in FIG. 1) to the dehydrogenation reactor through which it is expected to pass unchanged and then enter the pre-heated oxidation reactor. The resulting production of heat from the at least partial oxidative dehydrogenation of the reversibly bound hydrogen, and perhaps additionally, the selective combination as above, of the two oxidation of a functional group on the carrier molecule reactions is expected to ultimately result in a rapid heating of the dehydrogenation reactor and an enhanced rate of $H_2$ production.

In yet another aspect of the invention, a gas/liquid combination of an air feed and carrier liquid is introduced into a catalytic reactor. As a first reaction step the carrier is selectively oxidized to the extent necessary for supplying the heat of dehydrogenation with a concomitant consumption of the available oxygen. The air/selectively oxidized carrier mixture is now passed through a second reactor where the dehydrogenation reaction to provide the hydrogen takes place. The two reactor sections where respectively, a selective oxidation and a dehydrogenation of the carrier take place are in close thermal contact. As described above, this may be accomplished by means of a circulating heat-transfer fluid, or by employing adjacent channels of a microchannel reactor as described above.

Since in this aspect there is no intermediate gas/liquid separation, the gaseous product will comprise an $H_2/N_2$ mixture, and steam. For example, if the required heat for the dehydrogenation of the carrier is 20% of the lower heating value (LHV) of hydrogen (57.8 kcal/mole $H_2$) and is met by selective oxidation of the carrier with a similar heating value and oxygen consumption stoichiometry, then for every 100 cc of $H_2$ produced, 10 cc of $O_2$ (and 20 cc of $H_2$) would have been consumed. The effluent would then be approximately a 2:1, $H_2:N_2$ mixture which if necessary could be compressed to provide the needed partial pressure of hydrogen for the fuel cell.

In each of these aspects of the invention the at least partially dehydrogenated and at least partially oxidized "spent" carrier is regenerated in a catalytic hydrogenation process where (apart from any potential heat process requirements) hydrogen comprises the predominate fuel or energy input.

Carrier Features and Design

The carrier for hydrogen storage and delivery comprises chemical composition(s) which can provide hydrogen by means of a catalytic dehydrogenation reaction and additionally furnish thermal energy in a selective catalytic oxidation reaction using air, oxygen-enriched air, or oxygen, among other suitable oxidant sources. In an appropriate catalytic reactor, such as a microchannel reactor, this oxidation provides the required heat energy and necessary temperature for the dehydrogenation reaction to take place. The dehydrogenated and selectively oxidized "spent carrier" is regenerable in a catalytic hydrogenation process shown schematically below:

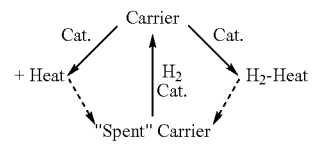

The carrier's two distinct roles in providing hydrogen as (a) a source of $H_2$ via a catalytic dehydrogenation process and (b) as a substrate for an exothermic selective oxidation may be realized by: 1) the carrier comprising a single bifunctional molecule that is designed to perform both such designated roles, 2) the carrier comprising molecules that can undergo reversible catalytic hydrogenation and dehydrogenation, and molecules that can undergo selective oxidation and 3) combinations of the foregoing. While any suitable carrier or combinations thereof can be employed, examples of suitable carriers are disclosed in Table 1.

Aromatic organic molecules such as benzene, toluene, xylenes, naphthalene, and methylnaphthalene, biphenyl, anthracene and phenanthrene can undergo reversible catalytic hydrogenation/dehydrogenation processes and in view of such properties, these compounds can be employed as carrier hydrogen storage media. A drawback of these carrier systems is that the perhydrogenated molecules require relatively high temperatures for their dehydrogenation. Pi-conjugated molecule carriers of U.S. Pat. Nos. 7,101,530 and 7,351,395 which comprise multi-ring aromatic compounds that contain nitrogen, oxygen or other heteroatoms, molecules that have a lower heat of dehydrogenation and hence can catalytically release $H_2$ at milder temperatures, while remaining liquid at least at reaction conditions. For example, as taught in U.S. Pat. No. 7,351,395 perhydro-N-ethylcarbazole in the presence of a supported palladium catalyst at 200° C. can release up to 5.7 wt % $H_2$. An input of heat, at 200° C., of ca. 12.4 kcal/mole $H_2$ is necessary to achieve dehydrogenation and release of gaseous hydrogen. Other examples of pi-conjugated molecules that could serve as hydrogen carriers are, 3-methylindole, N-methyl-3-methylindole, bis(indolyl) methane, 4,7-phenanthrolene, diphenyl ether. Acetone and related aliphatic ketones, by virtue of their reversible catalytic hydrogenation/dehydrogenation to secondary alcohols, e.g. as taught by Y. Han et al., Applied Catalysis, A 205 (1,2) 2001 p 79-84 and Nishimura pgs 185-193 may also be employed as the hydrogen carrier.

In one aspect of the invention, the aromatic organic molecules or the pi-conjugated substrates of the carrier perform the $H_2$-generation function, with the complementary heat generation role being provided by a second component of the carrier molecules. This secondary component can comprise a molecule containing a functional group in a molecule that can be exothermically, selectively oxidized by air or oxygen to a product which is convertible back to the original molecule by means of a catalytic hydrogenation process where (apart from incidental heat process requirements) hydrogen comprises the predominate or sole energy source or fuel.

The following classes are some examples of functional groups in molecules that can undergo this $H_2$-reversible selective oxidation chemistry:

1. Activated hydrocarbon functional groups such as alkyl groups attached to aromatic rings which can be selectively oxidized to alcohols, aldehydes, ketones, and carboxylic acids. Toluene, xylene, methylnaphthalene, methylfluorene are examples of molecules containing a methyl, —$CH_3$ hydrocarbon group that is activated (towards selective oxidation processes in the context of this invention) by virtue of its direct attachment to the aromatic moiety. Ethylbenzene, ethylnaphthalene, diphenylmethane and fluorene are examples of molecules that have an activated hydrocarbon methylene, —$CH_2$ group by virtue of its attachment to now two aromatic ring moieties. The aromatic moiety may be a phenyl group as in the above examples but it may also be an aromatic nitrogen or oxygen heterocyclic molecule such as for example methyl pyridine, methylcarbazole, or dipyridyl methane where the —$CH_3$ or —$CH_2$— group constitutes the activated aromatic function. Also included are partially hydrogenated aromatics such as tetrahydronaphthalene which can be oxidatively dehydrogenated (selectively oxidized) to naphthalene.

2. Aromatic and aliphatic Primary alcohol functional groups which can be selectively oxidized to the corresponding aldehydes and carboxylic acids.

3. Secondary alcohol functional groups which are oxidatively converted to ketones as for example isopropanol to acetone and phenyl-methyl-hydroxy methane to phenyl-methyl ketone.

4. Primary amines which can be oxidatively converted to alkyl or aryl nitriles, such as in the selective oxidation of ethylamine to acetonitrile.

5. Cyclic secondary amines which can be oxidatively converted to aromatic nitrogen heterocyclics, as for the oxidative conversion of 1,2,3,4-tetrahydroquinoline to quinoline.

6. N-methyl tertiary amines which can be selectively oxidized to N,N-dialkylformamides.

7. Sulfides which may be oxidized to sulfoxides, as the conversion of trimethylamine to dimethylformamide such as dimethyl sulfide to dimethylsulfoxides. Sulfoxides which may be oxidized to sulfones, as the selective oxidation of dimethylsulfoxides to dimethylsulfone.

The selectively oxidizable functional groups may: i) comprise a part of a molecule which is otherwise inert in the process and is the "second component" of the carrier, ii) be chemically attached to the aromatic or pi-conjugated substrate hydrogen storage molecule (this has the advantage of minimizing the amount of inert components or "dead weight" in the carrier liquid), and/or iii) comprise a physical mixture of a number of components in a carrier which may be advantageous for providing liquidity in a broader temperature range.

The selective oxidation chemistry of the functional groups (in an otherwise chemically inert representative molecule) is summarized in Table 1. Each representative molecule contains a functional group (shown in the table in bold type) that is selectively oxidizable. For example, the methyl group in an alkylated aromatic molecule may for the purpose of heat generation be oxidized to an aryl alcohol, aryl aldehyde, aryl ketone, arylcarboxylic acid or a mixture of all. In the context of this invention, the oxidation reaction is said to be selective, since there are minimal or no undesired bond breaking reactions and particularly there is a minimal or no net loss of carbon atoms from the molecule, e.g., as carbon dioxide, thus fulfilling the requirement that the "spent" carrier be regenerable with hydrogen. Exemplary selective oxidation reactions of carrier molecules, together with their standard enthalpy or heat of reaction ($\Delta H°$) are also provided in Table 1.

Where possible the enthalpy data in Table 1 was derived from published sources, using the "HSC Chemistry for Windows" program from Outokumpu Research Oy, Finland and the NIST Chemistry Web Book: Standard Reference Database No. 69, June 2005. Otherwise, the thermal data was estimated using the ab initio quantum mechanics computational method described in Section 5.1.2 of U.S. Pat. No. 7,351,395. This involves a calculation of the total energy of each of the reaction components and from this data estimating the overall enthalpy change. This was performed for hydrogenation and dehydrogenation reactions. Enthalpy changes for oxidation reactions were calculated on the basis of the corresponding hydrogenation reaction heats in combination with the experimental enthalpy for the combustion of hydrogen to steam (LHV of $H_2$).

This reaction enthalpy of the exemplary selective oxidation reaction is illustrative of the "calorific value" of the corresponding molecule's functional group in its selective oxidation to the designated product. The calorific value per formula weight (FW) of functional group is provided in Table 1 for the various cited functional groups. Functional group reactions having the highest heating value per unit weight are those involving a selective oxidation of activated hydrocarbons and primary alcohols to the corresponding carboxylic acids, and of dialkylmethylamines to dialkylformamides (e.g., 1b,c; 2a and 6 in Table 1). A modest level of heat generation may be seen in a selective oxidation of primary amines to nitrites (e.g., 4 in Table 1).

It is desirable that the carrier have a relatively large gravimetric and volumetric hydrogen storage capacity and additionally deliver the $H_2$ in an autothermal process (e.g., without requiring an external supply of heat). For achieving high hydrogen capacities, selectively oxidizable functional groups having a large calorific value are useful. It is also desirable to minimize the formula weight of the molecule containing the functional group. This can be accomplished by chemically attaching the selectively oxidizable group to the organic molecule reversible hydrogen carrier. This is illustrated by considering 2-methylnaphthalene where the aromatic moiety functions as a hydrogen carrier (via its reversible hydrogenation/dehydrogenation to 2-methyldecahydronaphthalene) and the methyl group can be selectively oxidized to the corresponding aromatic aldehyde, carboxylic acid or a mixture of the two:

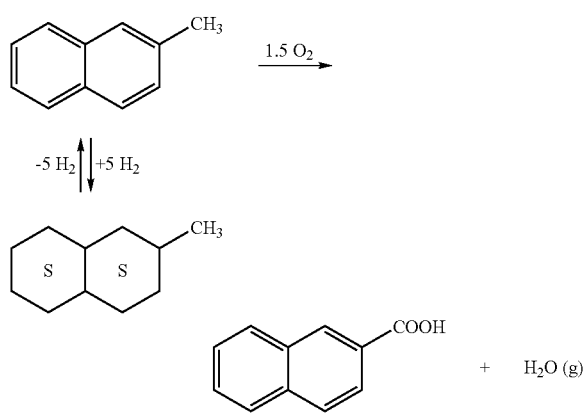

From Table 1 (row 1b), the calorific value of the selective oxidation of a methyl group to a carboxylic acid is 9.27 kcal/gram or 139 kcal/mole. The enthalpy for a dehydrogenation of decahydronaphthalene (decalin) to naphthalene (which is closely related to the 2-methyl derivative) is about −95 kcal/mole. An autothermal generation of hydrogen from 2-methyldecahydronaphthalene would, therefore, entail a selective oxidation of approximately $^{95}/_{139}$ or 68% of the methyl groups to carboxylic acid groups. In another illustration, assuming that there is a 90% oxidative conversion of 2-methylnaphthalene to a product comprising a 1:1 molar mixture of the aldehyde (1a in Table 1) and carboxylic acid (1b in Table 1), the overall hydrogen generation reaction would be autothermal with a desirable minimal exotherm of about 3 kcal/mole. Addition of the oxidizable functional group to the decalin carrier leads to a reduction in the potential gravimetric $H_2$ storage capacity of ca. 7.2 wt. % (decalin, $C_{10}H_{18}$) down to ca. 6.6 wt. % (2-methyldecalin, $C_{11}H_{20}$), with potentially some enhanced weight of the "spent" carrier, depending on the quantity of introduced oxygen. Alternatively, if the 95 kcal endotherm were supplied by a combustion of hydrogen, at least 95/57.8 (where 57.8 kcal/mole is the LHV for $H_2$) or 1.64 moles of $H_2$ would be consumed thus effectively reducing decalin's $H_2$ storage capacity from ca. 7.2 wt % to ca. 4.9 wt. % or less.

Other examples of carriers which combine in the same molecule the reversible hydrogen storage function and the selectively oxidizable groups are as follows: (1) Fluorene—for which the two aromatic six-membered rings can undergo a reversible hydrogenation/dehydrogenation to perhydrofluorene while the methylene group can be selectively oxidized with air to the keto group in 9-fluorenone. The "full cycle" process of an (at least near) autothermal delivery of hydrogen with a regeneration of this carrier is illustrated in Example 1. (2) The toluene/methylcyclohexane to benzaldehyde, or benzaldehyde and benzoic acid system (Table 1, 1(a) and 1(b). (3) The diphenylmethane/dicyclohexylmethane to benzophenone system. (4) The benzylalcohol/cyclohexylcarbinol to benzoic acid system, the N-methylcarbazole/perhydro-N-methylcarbazole to the N-formylcarbazole system. (5) The N-methyl, methylcarbazole/perhydro N-methyl methylcarbazole to N-methyl, formylcarbazole system. (6) bis(3-indolyl)methane/perhydrobis(3-indolyl)methane to bis(3-indolyl)ketone. (7) Isopropanol, $(CH_3)_2CHOH$, can undergo either a catalytic dehydrogenation with production of hydrogen with acetone, $(CH_3)_2C(O)$, as the by-product or it can be selectively oxidized to the same product and water (Table 1, 3), an appropriate balance of the two reactions thus potentially providing an autothermal generation of hydrogen. (8) The 2,4-hexanedione/2,4-hexanediol to 2-hydroxy, 4 pentanone system.

The defined "selective oxidation reaction" does not have to result exclusively in specific oxidation products but only in compositions which provide the necessary heating value and are also regenerable in subsequent selective catalytic reactions with hydrogen. It is thus desirable to minimize any carrier oxidation processes which result in a rupture of bonds between non-hydrogen atoms (e.g., of C—C, C—N, C—O, C—S linkages) which would produce molecular "fragments" that are not easily reconstituted into the original molecules in catalytic reactions with hydrogen.

Employing a methyl functional group as contained in a separate non-hydrogen carrier molecule would lead to an overall carrier having a lower calorific value. This disadvantage could however, be mitigated by selecting oxidizable molecules that have a relatively high gravimetric density of functional groups.

Selective Oxidation and Regeneration of Functional Groups

The catalytic selective oxidation of certain functional groups is shown in Table 1. These catalytic methodologies are illustrated with reference to the exemplary oxidation reactions for the functional group classes in the Table.

1. Activated hydrocarbon groups. These are defined as straight chain or branched saturated hydrocarbon groups that are attached to an aromatic molecule as illustrated by the methyl group in toluene, the ethyl group in ethyl benzene and the isopropyl group in cumene, the methylene group in diphenyl methane, and the methylene group in fluorene. The carbon atom of the hydrocarbon group that is immediately adjacent to the aromatic moiety (e.g. a benzyl carbon) is considered to be "activated" towards chemical reactivity, including oxidation, vis-a-vis the carbon atom of a saturated hydrocarbon molecule. Oxidation of activated hydrocarbon functional groups, such as the side chain groups on aromatic molecules (e.g. toluene as in 1a, 1b, 1c in Table 1) can be accomplished using air as the oxidant with nanoporous molecular sieves [R. Raja et al. *Catalysis Letters* 110,179 (2006)] and by cobalt tetraphenylporphyrin catalysts [C.-C. Guo et al. Applied Catalysis A—General 282, 55 (2005)]. A catalytic air oxidation of diphenylmethane to benzophenone using air as the oxidant over alumina-supported NaF and KF catalysts has been reported [by J. H. Clark et al. in *Journal of Chemical Research Synopses* 3, 102-3 (1994)]. V. R. Choudhary et al. in *Journal of Catalysis* 227, 257-261 (2004) have reported on the selective oxidation of diphenylmethane to benzophenone and of ethylbenzene to acetophenone with oxygen over an Mg—Al hydrotalcite catalyst [V. R. Choudhary et al. *Journal of Catalysis* 227, 257 (2004)]. Arylaldehydes (e.g. PhCHO) and arylcarboxylic acids can be hydrogenated by methods described below (for Reactions 2a, b and c in Table 1) to the corresponding benzyl alcohols. The benzyl alcohols in turn can undergo hydrogenolysis (reactions with C—O bond rupture by $H_2$) to regenerate the benzylic hydrocarbon. Useful catalysts for the hydrogenolysis reactions are palladium catalysts which have a lesser tendency to hydrogenate the aromatic ring ("Catalytic Hydrogenation in Organic Synthesis" by P. Rylander, Academic Press 1979, pages 271-275). As relating to Reaction 1c in Table 1, polyoxometallate catalysts have been employed for an oxidative dehydrogenation of cyclic saturated hydrocarbons (e.g. decalin), to yield partially hydrogenated cyclic compounds [A. I. Nekhaev et al. *Neftekhimiya* 42, 455 (2002)]. The partially hydrogenated cyclic compounds may then be fully reduced with hydrogen over supported platinum, platinum oxide or rhodium and ruthenium catalysts (P. Rylander, pages 175-179) to regenerate the carrier.

2. Primary alcohols. Selective oxidation of alcohols, with air or oxygen, has been disclosed [T. Malloft et al. Chem. Rev. 104, 3037 (2004)]. The most investigated primary alcohol substrates are those that are part of a conjugated system, i.e., benzyl alcohol (Reactions 2a, 2b in Table 1). The selective oxidation of primary alcohols to aldehydes and carboxylic acids can be accomplished by a variety of catalysts ranging from supported Pt group metals (usually with Bi or Pb promoters), redox metal oxides such as $RuO_2 \cdot xH_2O$, Ru-supported hydrotalcites, and redox molecular sieves. Oxidation of non-conjugated primary alcohols (e.g. ethanol), are illustrated by Reaction 2c in Table 1. Platinum group metals may be used in the presence of some water and base (T. Malloft et al., p. 3052). With nanoparticle gold catalysts on magnesium aluminate, a selective conversion of aqueous ethanol to acetic acid has been disclosed [C. H. Christensen et al. Angew. Chem. Int. Ed. 45, 4648 (2006)]. Highly dispersed gold on nano-crystalline cerium oxide permits a selective oxidation of aliphatic primary alcohols in the presence of base and water to carboxylic acids [e.g. n-hexanol to hexanoic acid; A. Abod et al. Angew. Chem. Int. Ed. 44 4066 (2005)]. In the substantial absence of solvent, carboxylic acid esters may also be formed.

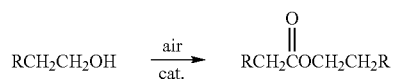

Carboxylic acid esters are potentially useful as selective oxidation products in the context of this invention since they can also be hydrogenated back to the alcohol. The selective hydrogenation of aldehydes, carboxylic acids and carboxylic acid esters to the corresponding primary alcohols can also be performed.

Aldehydes can be hydrogenated to the corresponding alcohols using Raney Ni, Pt oxide, and copper-chromium catalysts (S. Nishimura, "Handbook of Heterogenous Catalytic Hydrogenation for Organic Synthesis", John Wiley & Sons 2001, pgs. 170-178). The hydrogenation of carboxylic acids to alcohols usually entails more forcing conditions such as higher temperatures and elevated hydrogen pressures. Typical catalysts disclosed in the literature are copper chromite, Ru/C, and rhenium and rhodium oxides (P. Rylander, pgs. 64-65; S. Nishimura, pgs. 387-391). Carboxylic acid esters are typically hydrogenated over copper-chromium oxide catalysts at ca. 250° C. and high hydrogen pressures. However, a hydrogenation of esters at relatively mild conditions is possible, as demonstrated for a conversion of methyl acetate at 60° C. and 6 atm. $H_2$ to methanol, ethanol and ethyl acetate, using a potassium-doped ruthenium on carbon catalyst (G. Pez and R. Grey, U.S. Pat. No. 4,359,404; hereby incorporated by reference).

3. Secondary alcohols. The selective aerobic oxidation of secondary alcohols to ketones (Reaction 3, Table 1) can be accomplished over a variety of oxide-supported ruthenium and platinum catalysts, even in the absence of solvent media (T. Mallott, pgs. 3052-3053). A selective catalytic hydrogenation of ketones to regenerate the alcohol can likewise be accomplished, for example, using Raney nickel with base promoters, supported Ru and Rh catalysts, and, specifically for the hydrogenation of aliphatic ketones, Pd on oxide supports (P. Rylander, pgs. 82-84; S. Nishimura, pgs. 185-193).

4. Primary amines and cyclic secondary amines. Processes for a catalytic oxidative dehydrogenation of amines to imines or nitriles (Reaction 4 in Table 1) with air or oxygen can be employed. The aerobic oxidation of benzylamine with $O_2$ (1 atm.) in the presence of a copper catalyst ($CuCl_2$) and molecular sieve 3A (as a drying agent) to yield a mixture of benzonitrile and N-benzylidenebenzylamine has been described [Y. Maeda, T. Nishimura, and S. Uemura *Bull. Chem. Soc. Jpn.* 76, 2399 (2003)]:

The benzylamine dehydrogenation reactions are of zero-order in oxygen which implies that air (or perhaps advantageously depleted oxygen from a fuel cell) should be a suitable oxidant.

The dehydrogenation of aliphatic amines appears to be more selective. For example, N-octylamine is converted to the corresponding N-heptylnitrile in 96% isolated yield at 80° C. and 1 atm. $O_2$ pressure. Even more efficient aerobic dehydrogenations of primary amines to nitrites and imines have been described [K. Yamaguchi and N. Mizuno *Angew Chem. Int. Ed.* 42, 1480 (2003)]. Using ruthenium on alumina catalysts, it was possible to fully convert a test array of amines to the corresponding nitrites with good selectivity using $O_2$ (1 atm.) at 130° C. The selectivities are greatest for the oxidative dehydrogenation of long chain amines to nitriles. Even more selective are reactions involving an oxidative dehydrogenation of cyclic secondary amines, where an aromatic amine is the product. Examples are the conversions of indolene to indole and 1,2,3,4-tetrahydroquinoline to quinoline (Reaction 5 in Table 1), which both proceed with greater than 99% selectivity.

5. N-Methyl tertiary amines. The methyl group of a tertiary N-methyl amine can be selectively oxidized with air or oxygen to a N-formyl, —N(CO)H, group (Reaction 6 in Table 1) by a variety of catalytic systems. The conversion of trimethylamine to dimethylformamide by reaction with oxygen in the presence of a 15% Pd/charcoal catalyst has been reported (Rosenblatt, U.S. Pat. No. 3,483,210). An improved process resulted from the use of cupric chloride or other metal halides as catalysts (Sauer, U.S. Pat. No. 4,042,621). A variety of complex metal oxide systems ranging from xerogels, aerogels, to metal-substituted heteropolyacids can be used for the preparation of substituted formamides, R'RN(CO)H, from tertiary N-methylamines (D. Coulson et al. in WO 01/53252

A2). The previously identified patents and patent applications are hereby incorporated by reference.

The hydrogenation of acid amides, $RCONH_2$, to amines may be performed with copper-chromium oxide and copper-barium-chromium oxide catalysts at relatively forcing conditions (S. Nishimura, pgs. 406-411). Specifically, a hydrogenation of formamides to methylamines in the presence of methyl carbonyl catalysts has been reported [R. M. Laine et al. C1 Molecule Chemistry 1(1(1984)].

6. Selective oxidation of sulfides to sulfoxides and sulfones. There are available catalytic methodologies for a selective oxidation of organic sulfides, $R_2S$, (alternatively known as thioethers) to sulfoxides, $R_2S=O$, and sulfones, $R_2SO_2$, [Reactions 7, 8 in Table 1; A. V. Mashkina Catalysis Reviews-Science and Engineering 32, 105 (1990)]. Specifically, a selective oxidation of sulfides to sulfoxides under ambient aerobic conditions may be accomplished using the binary catalytic system, $BiBr_3$—$Bi(NO_3)_3$ [K. Komatsu *Chemistry Letters* 12, 1229 (1997)].

The reduction of sulfoxides and sulfones to thioethers is usually accomplished with chemical reductants, for example, using $NaBH_4/I_2$ [K. Baback *Synthesis* 3, 335 (2003)]. Reductions of $R_2SO$ or $R_2SO_2$ functional groups to $R_2S$ should be possible using $H_2$ and Raney Ni catalysts. An indication of this is that some thiol products are formed in the hydrogenation of unsaturated organic sulfones [L. Bateman J. Chem. Soc. pg. 2888 (1958)].

While these descriptions of aspects of the instant invention emphasize the ability to generate hydrogen without application of externally generated heat, the instant invention can be conducted when externally generated heat is supplied (e.g., heat from a fuel cell could be employed to pre-heat the inventive carrier). The following Examples are provided to illustrate certain aspects of the instant invention and shall not limit the scope of any claims appended hereto.

6. Experimental

Experimental Methodology

Analytical Instrumentation

The Gas Chromatography-Mass Spectrometer (GC-MS) instrument consists of a Hewlett Packard model 6890 gas chromatograph (RTx-35 column, 30 m length, 0.25 mm inner diameter, 0.25 μm packing thickness) and an Agilent model 5973 mass spectrometer. The GC-MS analytical methods used typically consist of temperature ramping to 310° C. Gel Permeation Chromatography (GPC) analysis was performed using an Alliance 2695 instrument with High Resolution, Low Mass Gel Permeation (maximum 2,000 Da) on three HR 0.5 Columns. Detection utilized a Waters Corporation Model 2414 Differential Refractometer. Matrix Assisted Laser Desorption Ionization (MALDI) mass spectroscopy was performed on a Bruker Biflex III instrument with no mass suppression. $^{13}C$ NMR spectroscopy was performed using a Bruker Advance 300 MHz instrument.

EXAMPLES

Example 1

Illustration of a "Full Cycle" $H_2$ Storage and Delivery Process

Sequential Dehydrogenation, Selective Oxidation, and Regeneration of Perhydrofluorene with Gaseous Hydrogen. The three steps of this cycle are experimentally demonstrated as detailed:

1. Dehydrogenation of cis,cis-Perhydrofluorene

Figure 8:
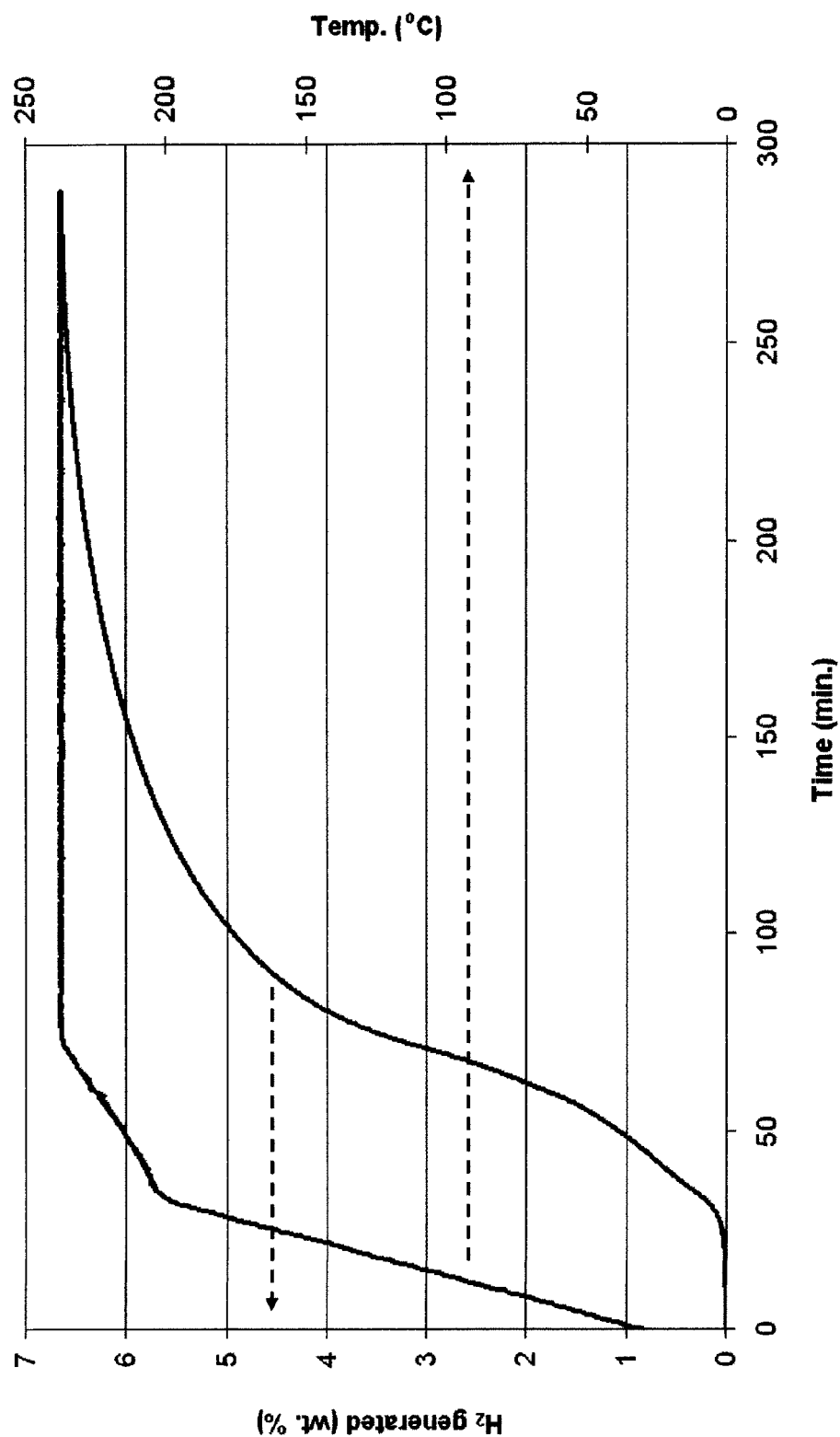
FIG. 8 is a plot of the generated hydrogen generation vs. time from the catalytic dehydrogenation of perhydrofluorene.

Perhydrofluorene (Aldrich, 97% purity, 100% cis,cis conformer as determined by GC-MS and $^{13}C$ NMR) was degassed by evacuation ($1.0\times10^{-3}$ torr) at 22° C. for 60 minutes. Under an argon atmosphere, 4.0 g of perhydrofluorene and 0.15 g of 5% platinum on alumina (dehydrogenation catalyst) were placed in a 20 cc stirred tank reactor and the reactor was sealed. The reactor was connected to a manifold containing a vacuum source, hydrogen source, and a flow measurement system consisting of a calibrated 10 and 100 sccm flow meters in series. After evacuation of residual air from the manifold lines, hydrogen was purged through the reactor to displace the argon from the reactor headspace. The reactor was heated at a rate of 5° C./min. to 200° C. with stirring (500 rpm) under one atmosphere of hydrogen. The reactor was then heated from 200° C. to 235° C. at a rate of 1° C./min. and held isothermally at 235° C. with continued stirring for 6 hours. The volume of evolved hydrogen gas was tabulated by calibrated flow meters. From this data (shown in FIG. 8), perhydrofluorene demonstrated a 6.65 wt. % hydrogen storage capacity. GC-MS analysis showing a 99% conversion of perhydrofluorene to fluorene verified the hydrogen flow data.

2. Oxidation of Fluorene with Air a. Liquid Phase Aerobic Oxidation of Fluorene with Au—Pd/$SiO_2$/$TiO_2$ Catalyst at a Temperature of 245° C.

1. The oxidation catalyst was prepared using the following procedure. Titanium(IV) isopropoxide (Aldrich, 99.999%) in the amount of 2.14 g (7.5 mmol) was dissolved in 50 ml 2-propanol and this solution was added to 12 g of powdered Cariact Q-10 silica (Fuji Silysia). The suspension was stirred for one hour at room temperature before removing the solvent in vacuo at 50° C. The resulting solid was dried in air at 110° C. for 3 hours followed by calcination in air at 600° C. for 4 hours. In a round bottom flask was added 1.89 g (5.6 mmol) $HAuCl_4$ (Strem, 99.9%) and 300 ml deionized water. The solution was heated to 65° C. with stirring and the pH adjusted to ca. 10 using 1M NaOH. To the resulting solution was added 0.86 g (2.9 mmol) $Pd(NH_3)_4(NO_3)_2$ (Alfa Aesar) dissolved in 25 ml deionized water water and 11.5 g of the $SiO_2$/$TiO_2$ support. The slurry was then stirred for one hour at 65° C. and cooled to room temperature. The catalyst was then filtered and washed 3 times with 350 ml deionized water until a $AgNO_3$ test showed no chloride ion was present in the deionized water wash. The filter cake was then dried at 110° C. overnight followed by a 3.5 hour calcination in air at 400° C.

2. The liquid phase oxidation of fluorene was then performed by the following procedure. To a 0.5" diameter test tube was added 0.8 g (4.8 mmol) fluorene (Aldrich, 98%) and 0.5 g Au—Pd/$SiO_2$/$TiO_2$. The tube was then lowered into a high temperature silicone oil bath and heated to 245° C. for 3 hours. During heating, air was purged over the reaction slurry. After three hours, the tube was cooled to room temperature, tetrahydrofuran was added to dissolve the organic constituents, and the catalyst was removed by filtration. GC-MS analysis of the extracted products showed 95% conversion of fluorene to two products, 27% fluorene dimers (molecular weight 344) and 68% 9-fluorenone (molecular weight 180).

b. Liquid Phase Aerobic Oxidation of Fluorene with Au—Pd/$SiO_2TiO_2$ Catalyst at 225° C.

1. In each of four quartz test tubes (0.5" diameter) was added 0.6 g (3.6 mmol) fluorene (Aldrich, 98%) and 0.3 g Au—Pd/$SiO_2$/$TiO_2$. The test tubes were lowered into a high temperature oil bath and heated to 225° C. Each tube was equipped with an air supply line which continuously purged air over the sample throughout the reaction period. One tube was removed every hour over four hours and the mixture was cooled, tetrahydrofuran was added to dissolve the organic constituents, and the catalyst was removed by filtration. GC-MS (Table 2) and GPC (Table 3) analyses were used to assay the reaction products.

TABLE 2

Product Distribution after Liquid Phase Oxidation of Fluorene at 225° C.

| Sample Components | Mole % in sample mixture after 1 hr. reaction time | Mole % in sample mixture after 2 hrs. reaction time | Mole % in sample mixture after 3 hrs. reaction time | Mole % in sample mixture after 4 hrs. reaction time |
|---|---|---|---|---|
| Fluorene | 13 | 8 | 9 | 3 |
| 9-Fluorenone | 25 | 43 | 76 | 81 |
| Dimer(s) | 62 | 49 | 15 | 16 |

TABLE 3

GPC Results from Liquid Phase Aerobic Oxidation of Fluorene at 225° C.

| Sample Components | Percentage of Sample Mixture after 1 hr. | Percentage of Sample Mixture after 2 hrs. | Percentage of Sample Mixture after 3 hrs. | Percentage of Sample Mixture after 4 hrs. |
|---|---|---|---|---|
| Monomer (fluorene + 9-fluorenone) | 31 | 27 | 49 | 51 |
| Dimer(s) | 40 | 28 | 13 | 17 |
| Oligomer(s) | 29 | 35 | 36 | 32 | c. Vapor phase oxidation of fluorene at 350° C. using a cesium promoted iron-vanadium catalyst. The catalyst was prepared according to literature procedures (F. Majunke et al., Proceedings of the 10$^{th}$ Int. Congress on Catalysis, 19-24 Jul. 1992; T. Tsukasa, et al., EP 779264 A1; Nippon Shakubai Co. Ltd.). The apparatus used for the vapor phase oxidation consisted of a 13 mm diameter quartz tube contained in a horizontal configuration within two tubular furnaces in series (zone 1 followed by zone 2). A rotameter was used to control the air flow through the tube. A 2 g sample of fluorene was loaded into a quartz boat and inserted into the section of quartz tube contained in heat zone 1. A catalyst bed consisting of 10 g of the cesium promoted iron-vanadium catalyst physically admixed with inert silica beads (Fuji Silysia Q-50) was loaded into the section of quartz tube contained in zone 2 and held in place by quartz wool plugs. The total catalyst bed volume was ca. 15 cc. Air was purged through zones 1 & 2 at a rate of 55 cc/min. while the catalyst bed was heated to 350° C. When this catalyst bed temperature was reached, zone 1 was heated to 200° C. (the temperature at which the vapor pressure of fluorene is ca. 120 torr and the fluorene to molecular oxygen mole ratio is approximately 0.8:1). Fluorene vapors were carried in the air carrier stream from zone 1 into the catalyst bed in zone 2. The reaction product condensed as a solid in a cooled product collection zone downstream of zone 2. After 1.5 hrs. of reaction time, the product in the collection zone was collected. GC-MS analysis of the reaction product showed >99% 9-fluorenone with no observable by-products.

3. Hydrogenation of 9-Fluorenone

A sample of 0.5 g (2.8 mmol) 9-fluorenone (Aldrich, 98%), 0.15 g Au—Pd/SiO$_2$/TiO$_2$ catalyst and 5 ml tetrahydrofuran (Fisher, HPLC Grade) were placed in a 20 cc stirred tank reactor and the reactor was sealed. The reactor was connected to a manifold containing a vacuum source, high-pressure hydrogen source, and a high-pressure ballast. After evacuation of residual air from the manifold lines, hydrogen was purged through the reactor to displace the air from the reactor headspace. The mixture was hydrogenated at 110 psia H$_2$ pressure and 70° C. for 16 hours. After cooling the reactor and venting the reactor to atmospheric pressure, the contents of the reactor were filtered to remove the catalyst. GC-MS analysis of the product showed complete conversion of 9-fluorenone to two products: fluorene (53.5%) and hexahydrofluorene (46.5%). To this solution of fluorene and hexahydrofluorene was added 0.15 g of a ruthenium supported on alumina catalyst (Engelhard, 5% Ru) and the slurry was returned to the reactor. The mixture was hydrogenated at 1000 psia H$_2$ pressure and 190° C. for 4 hours. After cooling and venting the reactor to atmospheric conditions, the catalyst was removed by filtration. GC-MS analysis of the product solution showed >99% conversion and >99% selectivity to perhydrofluorene. The cis,cis isomer of perhydrofluorene was obtained with 96% selectivity based on the GC retention time vs. commercial perhydrofluorene (Aldrich, 97%). INADEQUATE $^{13}$C NMR of the commercial perhydrofluorene confirmed the cis-cis stereochemistry of the four methine carbons in the central ring: 22.1 ppm (s), 24.3 ppm (s), 24.4 ppm (s), 29.2 ppm (s), 35.3 ppm (s), 37.3 ppm (s), 43 ppm (s), confirmed the cis-cis stereochemistry of the four methine protons in the central ring as reported by R. Meusinger in J. Prakt. Chem. 339, 128 (1997).

Example 2

Vapor Phase Partial Oxidation of Perhydrofluorene at 350° C.

The same reaction conditions and procedures for the gas phase oxidation of fluorene (as detailed in Example 1) were followed in this Example with the following exceptions: 2 g (11 mmol) perhydrofluorene (Aldrich, 97%) was placed in the quartz boat in zone 1, and the reaction temperature at zone 1 was held at 150° C. for 30 minutes before being heated to 200° C. for 1-5 hours. The condensed material in the product collection zone was dissolved with acetone. GC-MS analysis of the mixture is shown in Table 4. Conversion of perhydrofluorene was 39% and selectivity to fluorene and partially hydrogenated derivatives of fluorene was 98%.

TABLE 4

Product Distribution after Vapor Phase Oxidation of Perhydrofluorene

| Components in Mixture | Percentage of Component in Mixture |
|---|---|
| Perhydrofluorene | 61 |
| Fluorene | 20 |

TABLE 4-continued

Product Distribution after Vapor Phase Oxidation of Perhydrofluorene

| Components in Mixture | Percentage of Component in Mixture |
| --- | --- |
| 9-Fluorenone | 14 |
| Tetrahydrofluorene | 1 |
| Hexahydrofluorene | 2 |
| Unknown byproducts | 2 |

Example 3

Oxidative Dehydrogenation of Partially Dehydrogenated Perhydro-4,7-phenanthroline A sample of 4,7-phenanthroline was catalytically hydrogenated (4% Rh/Li aluminate catalyst, $H_2$ pressure of 800-900 psia) to yield ca. 77% perhydro-4,7-phenanthroline and a distribution of lesser hydrogenated components as shown in Table 5.

TABLE 5

Distribution of Product Mixture after Hydrogenation of 4,7-phenanthroline

| Components in Mixture | *Percentage of Component in Mixture |
| --- | --- |
| Perhydro-4,7-phenanthroline | 77 |
| Octahydro-4,7-phenanthroline | 18 |
| Decahydro-4,7-phenanthroline | 3 |
| Tetrahydro-4,7-phenanthroline | 2 |

*Results are based on GC-MS area percent

This mixture was then catalytically dehydrogenated under 1 atm. $H_2$ pressure using a 5% Pd on carbon catalyst. The mixture was heated with heating by temperature ramping (5° C./min.) from 25° C.) to 200° C. then held at 230° C. for 7 hours. An average product distribution over four runs afforded the product distribution as shown in Table 6.

TABLE 6

Product Distribution of 4,7-phenanthroline After Dehydrogenation

| Components in Mixture | *Percentage of Component in Mixture |
| --- | --- |
| Tetrahydro-4,7-phenanthroline | 52 |
| 4,7-phenanthroline | 27 |
| Dihydro-4,7-phenanthroline | 8 |
| Perhydro-4,7-phenanthroline | 13 |

*Results are based on GC-MS area percent

An oxidative dehydrogenation of this partially dehydrogenated perhydro-4,7-phenanthroline was then performed as follows. The dehydrogenated perhydro-4,7-phenanthroline latter mixture (22 g) and 6.2 g ruthenium on alumina (Engelhard, 5% Ru) were charged in a 50 ml 3-neck round bottom flask equipped with a distillation column for removal of water, an overhead stirrer and a syringe needle for purging air through the slurry. The flask was then heated to 230° C. and maintained at this temperature for 6 hours under an air purge with stirring. After cooling to room temperature, the slurry was taken up in tetrahydrofuran was used to dissolve the organic products and the catalyst was removed by filtration. GC-MS analysis of the products organic showed 14% conversion by oxidation with 98% selectivity. The composition of the product mixture is shown in Table 7. Further analyses by MALDI showed heavier masses which may correspond to dimers of oxidized intermediates of 4,7-phenanthroline as additional products.

TABLE 7

GC-MS results for Oxidative Dehydrogenation of Partially Dehydrogenated Perhydro-4,7-phenanthroline

| Components in Mixture | *Percentage of Component in Mixture |
| --- | --- |
| Tetrahydro-4,7-phenanthroline | 45 |
| 4,7-phenanthroline | 46 |
| Dihydro-4,7-phenanthroline | 6 |
| Perhydro-4,7-phenanthroline | 3 |

Example 4

Figure 3:
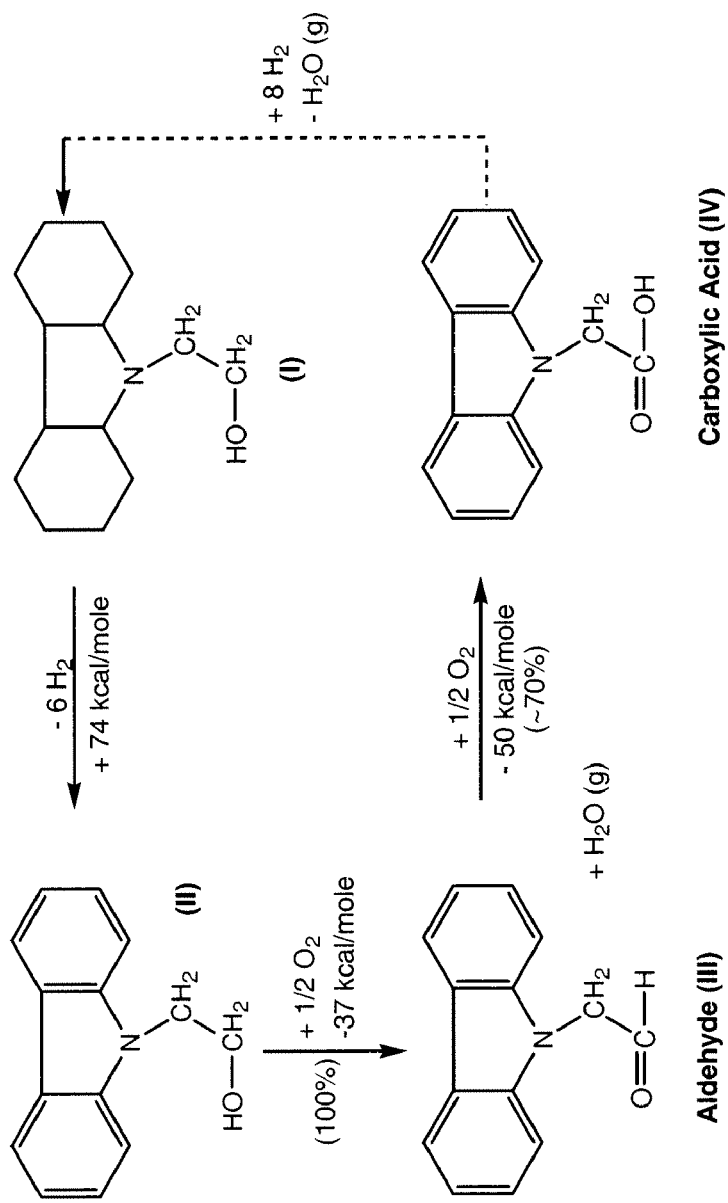
FIG. 3 is a schematic of the selective oxidation and hydrogen generation using 1-(carbazolyl)-2-hydroxyethane.

Use of 1-(Carbazolyl)-2-hydroxyethane as a Dual-Function Carrier (providing both $H_2$ storage and heat). Perhydro-1-(carbazolyl)-2-hydroxyethane (FIG. 3) is catalytically dehydrogenated over a Pd/$Al_2O_3$ catalyst at 200° C. in a flow reactor to yield 6 moles of $H_2$ per mole of perhydro-1-(carbazolyl)-2-hydroxyethane. The product hydrogen is separated from the liquid reactor effluent. The dehydrogenated carrier, while still at a temperature of around 200° C., is then admixed with a flow of air and passed through a second flow reactor which is strongly thermally coupled with the first. In the presence of a functional group selective oxidation catalyst which may be Pt, Pd on a redox oxide or a highly dispersed gold catalyst on such an oxide, the reaction leads to a mixture of the aldehyde and carboxylic acid products. From the respective reaction heats as shown in FIG. 3, the 74 kcal/mole endotherm for releasing $H_2$ from perhydro-1-(carbazolyl)-2-hydroxyethane can be met by a total conversion of 1-(carbazolyl)-2-hydroxyethane to an aldehyde followed by a 74% conversion of the aldehyde to the carboxylic acid. The "spent" carrier is catalytically re-hydrogenated at the aromatic rings using a Pt/$Al_2O_3$ catalyst then the aldehyde and ester groups are converted to the alcohol using a copper-chromite catalyst under pressure of hydrogen.

Example 5

N-Methyl-3-carbinolcarbazole Carrier

Figure 4:
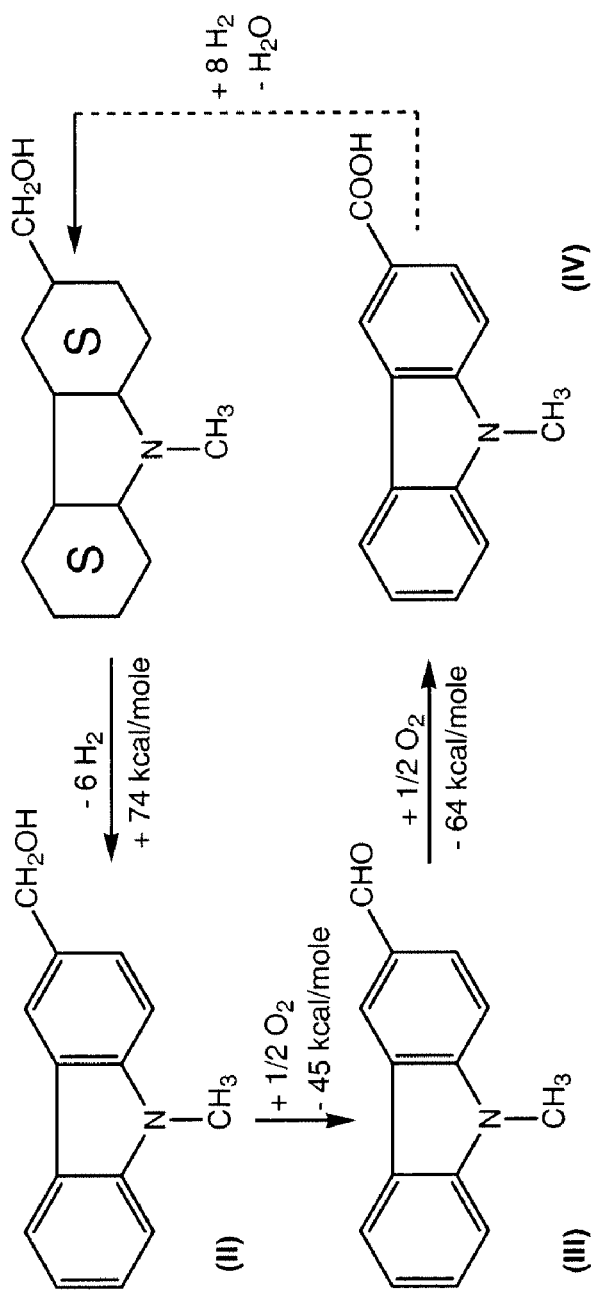
FIG. 4 is a schematic of the selective oxidation and hydrogen generation using N-methyl-3-carbinolcarbazole.

Perhydro-N-methyl-3-carbinolcarbazole is catalytically dehydrogenated over a supported Pd catalyst to give (II) (FIG. 4). As in Example 4, this is catalytically oxidized to a mixture of the aldehyde (III) and the carboxylic acid (IV). Ideally, full conversion of (II) to (III) followed by a 45% conversion of (III) to (IV) should suffice to provide the necessary heat for the dehydrogenation reaction. Conditions and catalysts for the oxidation and re-hydrogenation steps II→(III)→(I) are as described in Example 4.

Example 6

3-Hydroxymethylindole Carrier

Figure 5:
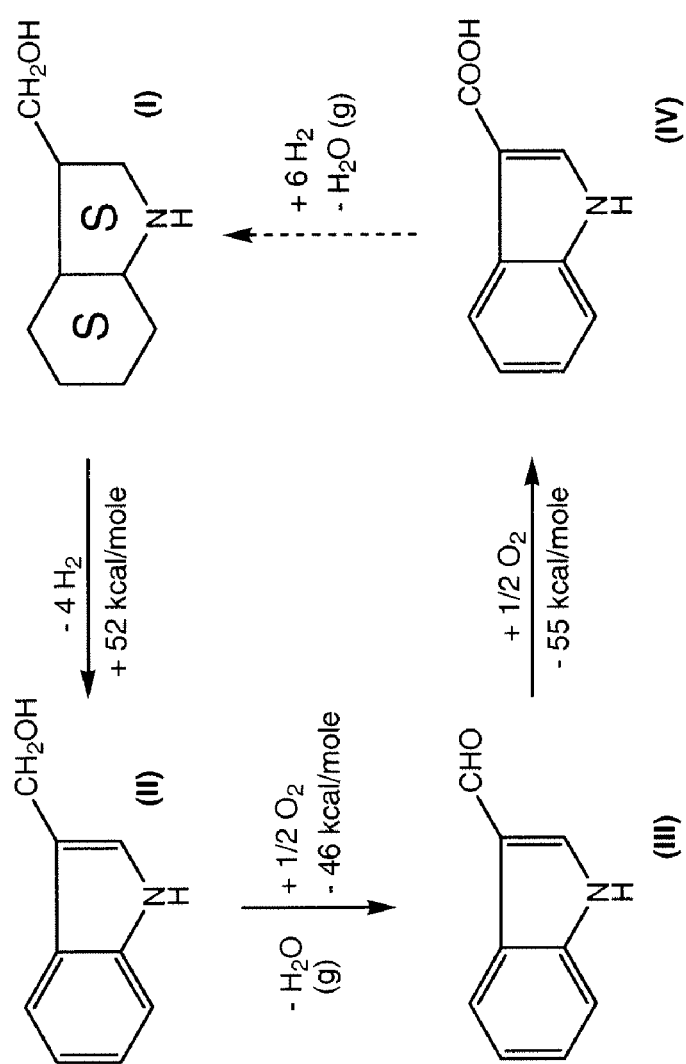
FIG. 5 is a schematic of the selective oxidation and hydrogen generation using 3-hydroxymethylindole.

Perhydro-3-carbinolindole (I in FIG. 5) is dehydrogenated over a supported Pd catalyst to provide $H_2$ and 3-carbinol indole (II). The latter is selectively oxidized under conditions as described in Example 1 to provide a mixture of the aldehyde (II) and carboxylic acid (IV). In a reactor where the endothermic dehydrogenation and the exothermic oxidation steps are thermally closely coupled a complete conversion of (II) to (III) followed by a 45% conversion of (III) to (IV) should suffice to provide the necessary heat for dehydrogenation. The re-hydrogenation of (III) and (IV) back to (I) is carried out with a combination of supported Pd and copper chromite catalysts.

Example 7

N-Methyl Carbazole/N-formyl Carbazole Carrier

Figure 6:
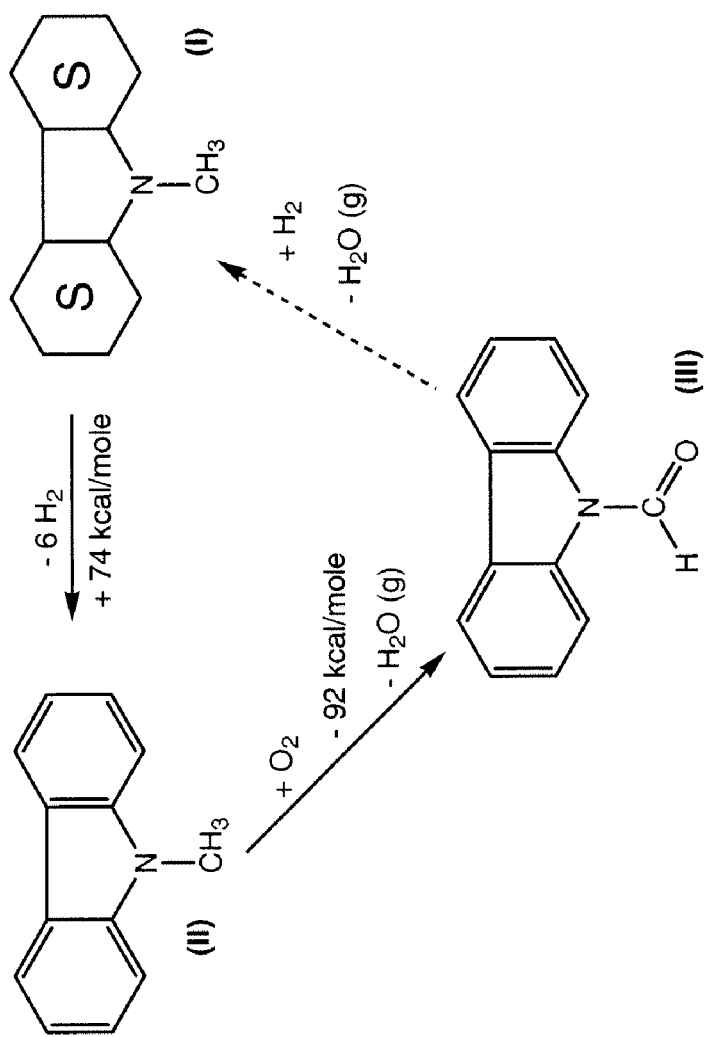
FIG. 6 is a schematic of the selective oxidation and hydrogen generation using N-methyl carbazole/N-formyl carbazole.

Perhydro-N-methylcarbazole is catalytically dehydrogenated over a supported Pd or Pt catalyst to provide $H_2$ and N-methylcarbazole (FIG. 6). Sequentially, the N-methyl group is oxidized with air using a copper halide catalyst to yield the N-formyl compound III. Because of the very high heat of this oxidative transformation, only an approximately 20% conversion of (II) to (III) should be necessary to provide for the heat of dehydrogenation.

Example 8

1-(Carbazolyl)-2-hydroxypropane Carrier

Figure 7:
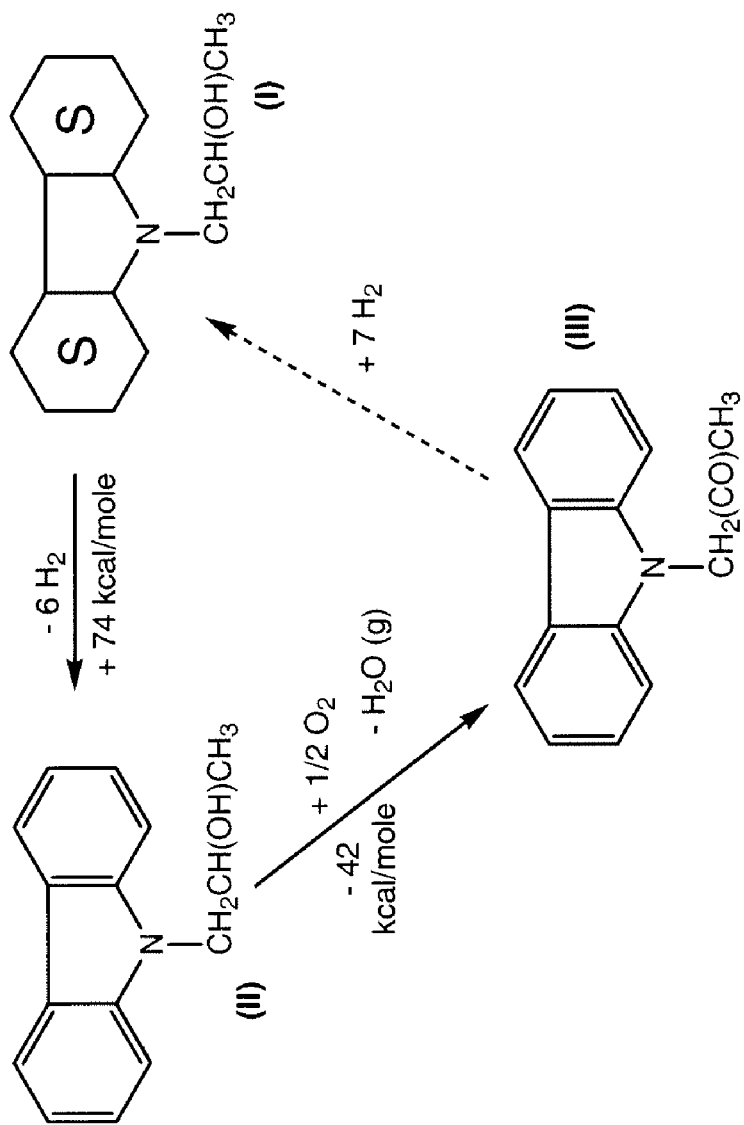
FIG. 7 is a schematic of the selective oxidation and hydrogen generation using 1-(carbazolyl)-2-hydroxypropane.

The dehydrogenated title compound (II in FIG. 7) is selectively oxidized over a supported Ru or Pd catalyst to the corresponding ketone compound (III). To a 15 ml round bottom flask were added 1.5 g (6.7 mmol) 1-(carbazolyl)-2-hydroxypropane, 1.5 g of a ruthenium on alumina catalyst (Engelhard, 5% Ru) and 4 g (21 mmol) N-ethylcarbazole (Aldrich, 95%) which is employed here as a solvent. Using an oil bath, the slurry was heated to 190° C. with stirring under an air purge for four hours. The reaction flask contents were then sampled by GC-MS and showed a 90% conversion (by GC-MS area percent) of the alcohol to the ketone. During the reaction period, the effluent air purge was bubbled through a Schlenk tube containing anhydrous ethanol. The ethanol solution was analyzed for water by Karl Fisher titration before and after the reaction. It was thus determined that 95% of the theoretical amount of water was generated during the oxidation of the alcohol to the ketone showing that an (exothermic) oxidative dehydrogenation rather than a spontaneous (endothermic) dehydrogenation had occurred. The exotherm for this reaction can only partially supply the heat for the endothermic dehydrogenation of (I) to (II) but may be useful when supplemented by other available heat sources.

6.1 Discussion of the Examples

Figure 9:
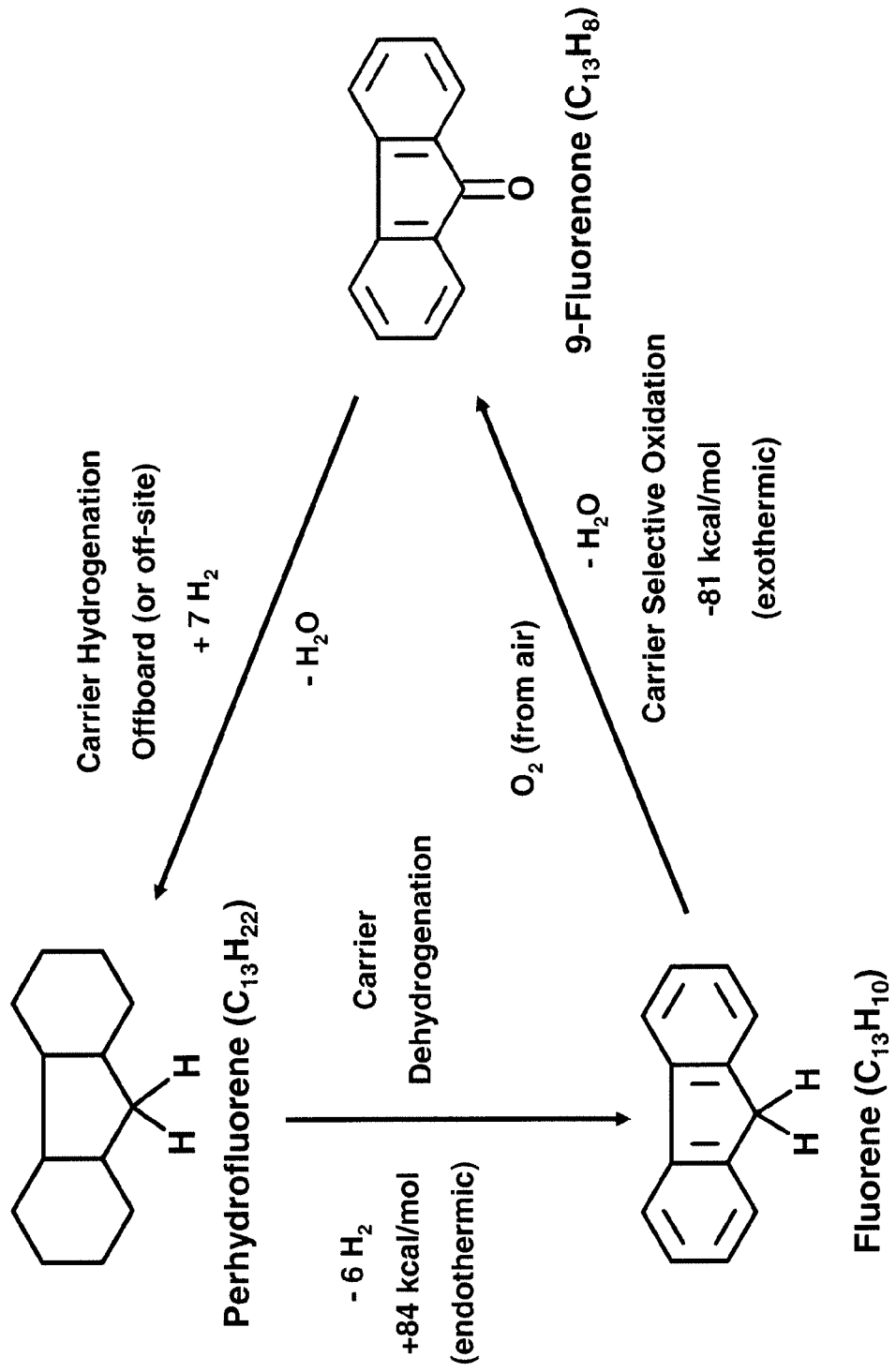
FIG. 9 is a schematic of a autothermal hydrogen storage and delivery cycle using the perhydrofluorene carrier system. Calculated heat values are shown as $\Delta H°$ (gas phase).

Example 1 demonstrates the overall autothermal hydrogen storage and delivery aspects of the invention as shown schematically in FIG. 1 using perhydrofluorene, $C_{13}H_{22}$, as the carrier. As illustrated in FIG. 9, the perhydrofluorene is catalytically dehydrogenated to fluorene, $C_{13}H_{10}$, in an endothermic reaction. After separation of hydrogen, the fluorene product undergoes selective oxidation, which may be conducted in the liquid or gas phase, to yield 9-fluorenone, $C_{13}H_8$, and water. The heat calculated for this exothermic oxidation reaction approaches the amount required for the dehydrogenation of the same molar amount of perhydrofluorene. The exothermic oxidation reaction can be conducted at temperatures (e.g. 245° C. and 350° C.) that are above the maximum endothermic dehydrogenation temperature (235° C.), facilitating heat transfer. In the final step of the cycle, the 9-fluorenone product is selectively hydrogenated to perhydrofluorene (typically conducted off-site or off-board), thus completing the cycle. A perhydrofluorene conformer mixture that is produced in the hydrogenation is ideally substantially composed of the cis, cis-perhydrofluorene conformer to allow for the lowest possible dehydrogenation temperature in the subsequent dehydrogenation step. Example 1 shows that the three independent catalytic reactions in the cycle can be accomplished with >98% conversion and >98% selectivity for each step. This relatively high selectivity is useful in the context of a reuseable carrier which should, for economic and practical reasons, ideally be used in many autothermal cycles without substantial costs for adding replacement carrier or rehabilitating degraded carrier material. The relatively high conversion rate is useful in the context of maximizing the amount of product hydrogen that is released in the autothermal hydrogen delivery cycle.

Example 2 relates to the sequential carrier oxidation-dehydrogenation aspect of the invention that is illustrated in FIG. 2. The same catalyst and reaction conditions that are used to selectively oxidize fluorene to 9-fluorenone can be used to oxidatively dehydrogenate perhydrofluorene to form fluorene and/or partially hydrogenated derivatives of fluorene (water is also formed as a reaction product). The heat change (exotherm) for the oxidative dehydrogenation of perhydrofluorene to fluorene is [[57.8 kcal/mole ($\Delta H°_f$ of $H_2O$ (g))×6]−84] kcal/mol (the dehydrogenation endotherm, c.f. FIG. 9)=−263 kcal/mole:

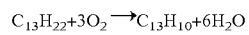

An additional 81 kcal/mole exotherm for the oxidation of fluorene to fluorene-9-one is potentially available to yield an overall reaction total of −344 kcal/mole:

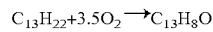

This Example shows that even with a partial oxidative dehydrogenation of perhydrofluorene, a relatively large quantity of heat can be generated. Thus, the conversion of this carrier to a mixture of 20% fluorene and 14% 9-fluorenone, (neglecting the other minor by-products) is expected to generate ca. 300 kcal/mole of reacted perhydrofluorene, which is sufficient heat for a dehydrogenation or $H_2$ release from ca. 3.6 moles of perhydrofluorene. In the context of a completely autothermal hydrogen storage and delivery cycle, the selective oxidation of a certain dehydrogenated carrier may not yield a sufficient amount of heat energy to offset the endothermic dehydrogenation. In this case, it may be practical to intentionally limit the endothermic dehydrogenation conversion to less than 100% so that some portion of the partially hydrogenated carrier is supplied to the oxidation reactor for oxidative dehydrogenation to occur. Alternatively, a limited, controlled portion of perhydrogenated carrier can be mixed with dehydrogenated carrier before the selective oxidation to increase the quantity of heat evolved from the oxidation reaction.

Example 3 demonstrates the oxidative dehydrogenation of a cyclic secondary amine (i.e. entry 5 in Table 1). Perhydro-4,7-phenanthroline was partially dehydrogenated, yielding less than 100% of the theoretically available $H_2$ from the carrier. A portion of the remaining available hydrogen was removed from the carrier by an exothermic oxidative dehydrogenation to yield heat energy and water. A comparison of the data in Tables 6 and 7, illustrates that a further dehydrogenation of the molecule is possible under oxidative conditions. This reaction could be usefully employed to provide some heat of reaction for driving the endothermic spontaneous dehydrogenation (ref. FIG. 9).

Examples 4-7 disclose a number of carriers that can be dehydrogenated to provide a gaseous hydrogen product and also contain functional groups that can be selectively oxidized to provide heat. Also disclosed are chemical processes for rehydrogenation of the dehydrogenated and oxidized "spent" carrier.

Example 8 demonstrates that a secondary alcohol functional group in a carrier can be selectively oxidized to a ketone in an exothermic process that generates heat energy and water. Analysis of the organic reaction products show no The present invention is not to be limited in scope by the specific description above, which is intended as illustrations of a few aspects of the invention that are within the scope of this invention. Indeed, various modifications of the invention in addition to those shown and described herein will become apparent to those skilled in the art and are intended to fall within the scope of the appended claims.

TABLE 1

| Class of Selectively Oxidizable Functional Group | Functional Group in a Representative Molecule | Oxidative Dehydrogenation Product | Selective Oxidation Reactions of Functional Group in Exemplary Molecules | Exemplary Reaction Enthalpy, $\Delta H°$ (kcal/mole carrier) | Calorific Value per FW of Funct Group (kcal/gram) |
|---|---|---|---|---|---|
| 1. Activated hydrocarbon groups | a. $Ar-CH_3$ | $Ar-CHO$ | $C_6H_5-CH_3 (g) + O_2 \rightarrow C_6H_5-CHO (g) + H_2O (g)$ | −78.5 | 5.23 |
| | b. $Ar-CH_3$ | $Ar-CH_2OH$ | $C_6H_5-CH_3 (g) + O_2 \rightarrow C_6H_5-CH_2OH (g) + H_2O (g)$ | −36 | 2.4 |
| | c. $Ar-CH_3$ | $Ar-COOH$ | $C_6H_5-CH_3 (g) + 2 O_2 \rightarrow C_6H_5-COOH (g) + 2 H_2O (g)$ | −139.1 | 9.27 |
| | d. $Ar-CH_2-Ar$ | $Ar-C(O)-Ar$ | $C_6H_5-CH_2-C_6H_5 (g) + O_2 \rightarrow C_6H_5C(O)-C_6H_5 (g) + H_2O$ | −82.3 | 5.88 |
| | e. 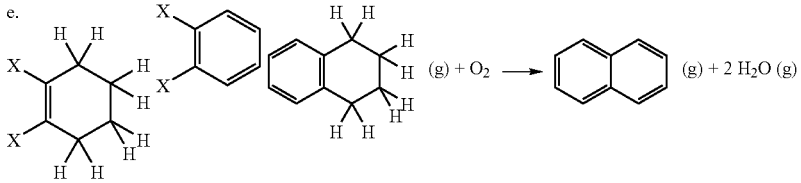 | | | −86.0 | 1.05 |
| 2. Primary alcohols | a. $Ar-CH_2OH$ | $Ar-CHO$ | $C_6H_5-CH_2OH (g) + ½ O_2 \rightarrow C_6H_5-CHO (g) + H_2O (g)$ | −42.6 | 1.37 |
| | b. $Ar-CH_2OH$ | $Ar-COOH$ | $C_6H_5-CH_2OH (g) + O_2 \rightarrow C_6H_5-COOH (g)$ | −103 | 3.33 |
| | c. $R-CH_2OH$ | $R-CHO$ | $C_2H_5OH (g) + ½ O_2 \rightarrow CH_3CHO (g) + H_2O (g)$ | −41.4 | 1.34 |
| 3. Secondary alcohols | a. $R-CH(OH)-R'$ | $RR'C=O$ | $(CH_3)_2CHOH (g) + ½ O_2 \rightarrow (CH_3)_2C=O (g) + H_2O (g)$ | −44.5 | 1.48 |
| | b. $Ar-CH(OH)-R$ | $Ar-CO-R$ | $(C_6H_5)(CH_2)CHOH (g) + ½ O_2 \rightarrow (C_6H_5)(CH_3)CO (g) + H_2O (g)$ | −47.4 | 1.69 |
| 4. Primary amines | $R-CH_2NH_2$ | $RC-C\equiv N$ | $C_2H_5NH_2 (g) + O_2 \rightarrow CH_3CN (g) + 2H_2O (g)$ | −83.6 | 2.79 |
| 5. Cyclic secondary amines | 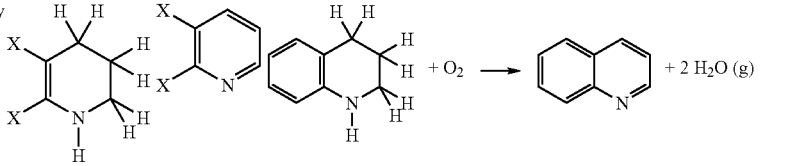 | | | −43.3 | 0.53 |
| 6. N-Methyl tertiary amines | $RR'N-CH_3$ | $RR'N-CH(O)$ | $(CH_3)_2N-CH_3 (g) + O_2 \rightarrow (CH_3)_2N-CH(O) (g) + H_2O (g)$ | −98 | 6.53 |
| 7. Sulfides to Sulfoxides | $R-S-R'$ | $R-S(O)-R'$ | $(CH_3)_2S (g) + ½ O_2 \rightarrow (CH_3)_2SO (g)$ | −27 | 0.84 |
| 8. Sulfoxides to Sulfones | $R-S(O)-R'$ | $R(SO_2)R'$ | $(CH_3)_2SO + ½ O_2 \rightarrow (CH_3)_2SO_2 (g)$ | −53 | 1.10 | unwanted byproducts and the amount of water produced in the reaction verifies the oxidative dehydrogenation. This autothermal generation of hydrogen from perhydro-1-(carbazolyl)-2-hydroxyethane is accomplished at a relatively small hydrogen capacity penalty for the carrier relative to the non-hydroxylated analog (5.37 wt. % $H_2$ for perhydro-1-(carbazolyl)-2-hydroxyethane versus 5.78 wt. % $H_2$ for perhydro-N-ethylcarbazole), with the advantage of potentially providing at least part of the heat and the thermal driving force (i.e. temperature) for the endothermic dehydrogenation to take place. Meeting these thermal requirements by a combustion of product $H_2$ would lead to a loss of at least 74/57.8 (the LHV for $H_2$) or 1.28 moles of $H_2$ which is a hydrogen capacity loss of at least 21% for the carrier.

The invention claimed is:

1. A process comprising:
   a) providing a composition comprising at least one member selected from the group consisting of: 1) a single molecule that is capable of reversible hydrogenation and oxidation, 2) at least two molecules wherein one of the molecules can undergo reversible catalytic hydrogenation and dehydrogenation, and another molecule that can undergo selective oxidation and 3) combinations of the foregoing,
   b) contacting the composition with at least one solid catalyst under endothermic reaction conditions sufficient to release gaseous hydrogen from the composition and produce an at least partially dehydrogenated composition, c) recovering the gaseous hydrogen,
d) contacting the at least partially dehydrogenated composition under selective oxidation conditions with at least one solid catalyst to generate heat and an at least partially oxidized composition; wherein the temperature used during step d) is greater than the temperature used during step b),
e) recovering at least a portion of the heat and using the recovered heat to provide at least part of the heat required for said hydrogen release, and;
f) a recovering the at least partially oxidized composition.

2. A process for reversibly storing and releasing hydrogen comprising the steps of:
a) providing a composition comprising at least one member selected from the group consisting of: 1) a single molecule that is capable of reversible hydrogenation and oxidation, 2) at least two molecules wherein one of the molecules can undergo reversible catalytic hydrogenation and dehydrogenation, and another molecule that can undergo selective oxidation and 3) combinations of the foregoing,
b) contacting the composition with at least one solid catalyst under endothermic reaction conditions thereby releasing gaseous hydrogen from the composition and producing at least one partially dehydrogenated composition,
c) recovering the gaseous hydrogen,
d) contacting the at least one partially dehydrogenated composition under exothermic oxidation reaction conditions in a gas phase with at least one solid catalyst to generate heat and at least one partially oxidized composition,
e) recovering at least a portion of the heat and using the recovered heat in order to release hydrogen in step b);
f) recovering the at least one partially oxidized composition, and;
g) converting the at least one partially oxidized composition into the composition of step a) via one or more catalytic hydrogenation processes.

3. The process of claim 2 wherein the composition comprises a hydrogen releasing molecule comprising at least one member selected from the group consisting of: i) a single six-membered ring; ii) linked six-membered rings; iii) fused six-membered rings; iv) fused six-membered and five-membered rings, v) the foregoing items i) through iv) further comprising one or more nitrogen and oxygen heteroatoms; and vi) single 5-membered ring structures that comprise nitrogen and oxygen heteroatoms.

4. The process of claim 3 wherein the composition and dehydrogenated composition comprise at least one member selected from the group consisting of benzene/cyclohexane, toluene/methylcyclohexane; naphthalene/decahydronaphthalene; methylnaphthalene/decahydromethylnaphthalene; terphenyl/perhydroterphenyl; N-methylcarbazole/perhydro-N-methylcarbazole; N-ethylcarbazole/perhydro-N-ethylcarbazole; fluorene/perhydrofluorene; acetone/isopropanol; and 2,4-hexanedione/2,4-hexanediol.

5. The process of claim 2 wherein the composition comprises at least one oxidizable molecule and an oxidized molecule selected from the group consisting of: toluene to benzyl alcohol; toluene to benzaldehyde; toluene to benzoic acid; diphenylmethane to benzophenone; benzyl alcohol to benzaldehyde; benzyl alcohol to benzoic acid; ethanol to acetaldehyde; isopropanol to acetone; 1-phenyl-1-hydroxyethane to acetophenone; ethylamine to acetonitrile; trimethylamine to dimethylformamide; dimethyl sulfide to dimethylsulfoxide and dimethyl sulfoxide to dimethyl sulfone.

6. The process of claim 5 wherein the composition comprises at least one member selected from the group consisting of: toluene to benzaldehyde, toluene to benzoic acid, diphenylmethane to benzophenone, benzyl alcohol to benzoic acid, and trimethylamine to dimethylformamide.

7. The process of claim 2 wherein the composition comprises a molecule having oxidizable groups and oxidation products selected from the group consisting of: i) activated hydrocarbon groups that are selectively oxidized to a hydroxymethylene, —$CH_2OH$ group; to a formyl, —C(O)H; carboxyl —COOH; keto —C(O)— or aromatic group; ii) primary alcohol groups that are selectively oxidized to a formyl or to a carboxyl group, iii) secondary alcohol groups that are selectively oxidized to form a keto group, iv) primary amine groups that are selectively oxidized to a nitrile, v) cyclic secondary amine groups that are selectively oxidized to an N-heterocyclic aromatic, vi) an N-methylamine that is selectively oxidized to a formamide, vii) a sulfide that is selectively oxidized to a sulfoxide, and vii) a sulfoxide that is selectively oxidize to a sulfone.

8. The process of claim 2 wherein the composition comprises a single molecule that is capable of reversible hydrogenation and oxidation, and dehydrogenated products selected from the group consisting of: i) toluene/methylcyclohexane to benzaldehyde and benzoic acid, ii) toluene/methylcyclohexane to benzaldehyde; iii) fluorene/perhydrofluorene to 9-fluorenone; iv) diphenylmethane/dicyclohexylmethane to benzophenone; v) benzyl alcohol/cyclohexylcarbinol to benzoic acid; vi) N-methyl carbazole/perhydro-N-methylcarbazole to N-formylcarbazole, vii) bis(3-indolyl)methane/perhydrobis(3-indolyl)methane to bis(3-indolyl)ketone, viii) acetone/isopropanol to 2-oxo-propionic acid, and x) 2,4-hexanedione/2,4-hexanediol to 3,5-dioxohexanoic acid.

9. The process of claim 8 wherein the molecule comprises fluorene.

10. The process of claim 8 wherein the molecule comprises diphenylmethane.

11. The process of claim 8 wherein the molecule comprises toluene.

12. The process of claim 2 wherein the oxidation temperature is greater than the dehydrogenation temperature.

13. The process of claim 2 wherein the dehydrogenation is conducted in the liquid phase.

14. The process of claim 1 further comprising hydrogenating the at least partially oxidized composition.

15. The process of claim 2 wherein the composition comprises a first component capable of reversible catalytic hydrogenation and dehydrogenation, and a second component having an at least partially selectively oxidizable functional group by air or oxygen.

16. The process of claim 15 wherein the second component provides at least part of the heat required for an endothermic catalytic dehydrogenation of the composition that is sufficient to release the gaseous hydrogen.

17. The process of claim 15 wherein the second component comprises at least one member selected from the group consisting of an activated hydrocarbon, a primary or secondary alcohol, a primary amine, a tertiary amine and a sulfide.

18. The process of claim 1 wherein the catalyst of step (c) comprises at least one metal selected from the group consisting of gold, palladium, titanium, cesium, iron, and vanadium.

19. The process of claim 2 wherein the catalyst of step (c) comprises at least one metal selected from the group consisting of gold, palladium, titanium, cesium, iron, and vanadium.

20. The process of claim 1 wherein the oxidation reaction conditions generate heat, at least one partially oxidized composition and water.

21. The process of claim 2 wherein the oxidation reaction conditions generate heat, at least one partially oxidized composition and water.

22. The process of claim 1 wherein the recovered heat is sufficient to conduct the dehydrogenating without external heat input.

23. The process of claim 1 wherein said recovering hydrogen comprises passing the gaseous hydrogen and dehydrogenated composition through a gas-liquid separator.

24. The process of claim 2 wherein the oxidized composition is hydrogenated with gaseous hydrogen.

* * * * *